(12) United States Patent
Kawachi et al.

(10) Patent No.: US 9,483,987 B2
(45) Date of Patent: Nov. 1, 2016

(54) EMBEDDED TOUCH SCREEN

(71) Applicant: Panasonic Liquid Crystal Display Co., Ltd., Himeji-shi, Hyogo (JP)

(72) Inventors: Genshiro Kawachi, Osaka (JP); Kazuo Kita, Osaka (JP); Kikuo Ono, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 116 days.

(21) Appl. No.: 13/770,618

(22) Filed: Feb. 19, 2013

(65) Prior Publication Data

US 2013/0215057 A1    Aug. 22, 2013

(30) Foreign Application Priority Data

Feb. 20, 2012  (JP) ................................. 2012-033837

(51) Int. Cl.
*G09G 3/36* (2006.01)
*G06F 3/044* (2006.01)

(52) U.S. Cl.
CPC ............. *G09G 3/3611* (2013.01); *G06F 3/044* (2013.01)

(58) Field of Classification Search
USPC ........................................................ 345/104
See application file for complete search history.

(56) References Cited

U.S. PATENT DOCUMENTS

| | | | | |
|---|---|---|---|---|
| 5,940,064 A | * | 8/1999 | Kai et al. ...................... | 345/173 |
| 2004/0004606 A1 | * | 1/2004 | Kodate et al. ................ | 345/204 |
| 2006/0208984 A1 | * | 9/2006 | Kim et al. ..................... | 345/90 |
| 2008/0018612 A1 | | 1/2008 | Nakamura et al. | |
| 2010/0001973 A1 | * | 1/2010 | Hotelling et al. ............ | 345/174 |
| 2010/0066692 A1 | * | 3/2010 | Noguchi et al. .............. | 345/173 |
| 2010/0085281 A1 | * | 4/2010 | Yokota ........................... | 345/76 |
| 2010/0097344 A1 | * | 4/2010 | Verweg ......................... | 345/174 |
| 2010/0110038 A1 | * | 5/2010 | Mo et al. ...................... | 345/174 |
| 2011/0216039 A1 | * | 9/2011 | Chen et al. ................... | 345/174 |

(Continued)

FOREIGN PATENT DOCUMENTS

| | | |
|---|---|---|
| JP | 2008-027292 | 2/2008 |
| JP | 2011-527787 | 11/2011 |

OTHER PUBLICATIONS

Kanda, et al., "Integrated Active Matrix Capacitive Sensors for Touch Panel LTPS-TFTLCDs", SID Symposium Digest of Technical Papers, vol. 39, Issue 1, pp. 834-837, May 2008.

(Continued)

*Primary Examiner* — Alexander Eisen
*Assistant Examiner* — Kebede Teshome
(74) *Attorney, Agent, or Firm* — Hamre, Schumann, Mueller & Larson, P.C.

(57) ABSTRACT

Provided is an embedded touch screen, including: a first substrate; a second substrate including: scanning signal lines extending in a first direction; video signal lines extending in a second direction; a plurality of pixels each including a pixel electrode connected to corresponding one of the video signal lines via a switching element connected to corresponding one of the scanning signal lines; and a common electrode; a liquid crystal layer; an application circuit for applying an alternating signal to a plurality of excitation electrodes; a detection circuit for detecting a signal excited on a plurality of detection electrodes each arranged adjacent to each of the plurality of excitation electrodes; and a scanning circuit for scanning at least one of each of the plurality of excitation electrodes and each of the plurality of detection electrodes at least in the second direction.

7 Claims, 18 Drawing Sheets

(56) References Cited

U.S. PATENT DOCUMENTS

| | | |
|---|---|---|
| 2011/0267296 A1 | 11/2011 | Noguchi et al. |
| 2012/0057312 A1* | 3/2012 | Yoo et al. ............ 361/749 |
| 2012/0071206 A1 | 3/2012 | Pemberton-Pigott |
| 2013/0155059 A1 | 6/2013 | Wang et al. |

OTHER PUBLICATIONS

Office Action issued in U.S. Appl. No. 14/547,592, Feb. 25, 2016, 18 pages.

* cited by examiner

EMBEDDED TOUCH SCREEN

CROSS-REFERENCE TO RELATED APPLICATION

The present application claims priority from Japanese application JP 2012-033837 filed on Feb. 20, 2012, the content of which is hereby incorporated by reference into this application.

BACKGROUND OF THE INVENTION

1. Field of the Invention

The present invention relates to an embedded touch screen.

2. Description of the Related Art

A tablet-type information terminal and a multifunctional mobile phone (so-called smartphone) including a touch screen have become popular. The "touch screen" as used herein refers to a device obtained by combining a touch panel to an image display device such as a liquid crystal display device. Further, the "touch panel" as used herein refers to a planar contact-detection type pointing device. A user directly touches the touch screen with a finger, a stylus, or the like while looking at an image displayed on the screen, thereby performing input.

The generally popularized touch screen is obtained by integrally bonding the image display device and the contact-detection type input device, which are separately formed. Such a touch panel has disadvantages in panel thickness and weight, the number of components, and its cost. Further, the number of manufacturing steps increases, and hence there arises a problem of decreasing yields.

In view of this, there has been proposed a touch screen in which the image display device and the contact-detection type input device are not separately formed but integrally formed. Such a touch screen is referred to as, for example, "embedded type" or "in-cell type". In this specification, such a touch screen is hereinafter called an "embedded touch screen".

JP 2008-027292 A describes an embedded touch screen in which an optical sensor and a thin film transistor (TFT) for taking out an output of the sensor as a charge voltage are arranged in a pixel of the liquid crystal display device.

JP 2011-527787 A describes an embedded touch screen in which a common electrode of the liquid crystal display device is divided into blocks for mutual capacitive coupling, and contact detection is performed based on the capacitive change during touching.

Eiji Kanda, Tsukasa Eguchi, Yasunori Hiyoshi, Taketo Chino, Yasushi Tsuchiya, Takahiro Iwashita, Tokuro Ozawa, Takao Miyazawa, Tomotaka Matsumoto (2008), "Integrated Active Matrix Capacitive Sensors for Touch Panel LIPS-TFTLCDs," SID symposium digest of technical papers, Vol. 39, Issue 1, 834-837 describes an embedded touch screen in which a capacitive element and a signal reading TFT are provided in a pixel of the liquid crystal display device, and the capacitive fluctuation caused by the fluctuation of a liquid crystal cell gap during touching is read outside.

In the embedded touch screens described in JP 2008-027292 A and Kanda et al., a TFT different from a TFT for driving liquid crystal needs to be provided in the pixel, but in this case, the pixel aperture ratio reduces. Particularly in a small-sized or high resolution image display device, the TFT originally occupies a large area in proportion to the entire pixel, and hence it is not very realistic to further increase the number of TFTs in the pixel.

In the embedded touch screen described in JP 2011-527787 A, the common electrode needs to be divided into complicated shapes, and the contact detection is performed for each block, which degrades the accuracy of coordinate detection. In order to increase the accuracy of coordinate detection, it is necessary to divide the common electrode into a larger number of small blocks, but on the other hand, each block requires a detection circuit including an amplifier. Therefore, when the accuracy of coordinate detection is increased, the circuit scale of the detection circuit is increased.

SUMMARY OF THE INVENTION

The present invention has been made in view of the above-mentioned circumstances, and has an object to provide an embedded touch screen which is capable of performing coordinate detection with sufficient accuracy by a detection circuit simpler than that in a conventional technology without reduction of a pixel aperture ratio.

The invention disclosed in this application has various aspects, and the summary of representative aspects is as follows.

(1) An embedded touch screen, including: a first substrate; a second substrate including, on a front surface thereof: a plurality of scanning signal lines extending in a first direction; a plurality of video signal lines extending in a second direction; a plurality of pixels sectioned by the plurality of scanning signal lines and the plurality of video signal lines in matrix being arranged in an image region and each including a pixel electrode connected to corresponding one of the plurality of video signal lines via a switching element connected to corresponding one of the plurality of scanning signal lines; and a common electrode; a liquid crystal layer sandwiched between the first substrate and the second substrate; an application circuit for applying an alternating signal to a plurality of excitation electrodes each arranged along one of the first direction and the second direction; a detection circuit for detecting a signal excited on a plurality of detection electrodes each arranged adjacent to each of the plurality of excitation electrodes; and a scanning circuit for scanning, during application by the application circuit and detection by the detection circuit, at least one of the plurality of excitation electrodes and the plurality of detection electrodes at least in the second direction.

(2) The embedded touch screen according to Item (1), in which the plurality of excitation electrodes and the plurality of detection electrodes each include at least one of the pixel electrode, the common electrode, each of the plurality of video signal lines, and a video signal shielding electrode provided in parallel to the each of the plurality of video signal lines in an overlapping manner.

(3) The embedded touch screen according to Item (1) or (2), in which, during the application by the application circuit and the detection by the detection circuit, the detection circuit simultaneously detects the signals excited on the plurality of detection electrodes in the second direction.

(4) The embedded touch screen according to Item (1) or (2), in which, during the application by the application circuit and the detection by the detection circuit, the detection circuit detects the signals excited on the plurality of detection electrodes through the scanning by the scanning circuit in the second direction.

(5) The embedded touch screen according to any one of Items (1) to (4), in which the plurality of excitation electrodes and the plurality of detection electrodes each cross a part of the plurality of pixels in a width direction orthogonal to an arrangement direction thereof.

(6) The embedded touch screen according to Item (5), in which a pitch between corresponding one of the plurality of excitation electrodes and corresponding one of the plurality of detection electrodes, which are adjacent to each other, is larger than a distance between a front surface of the first substrate and the front surface of the second substrate.

(7) The embedded touch screen according to any one of Items (1) to (6), in which the application circuit applies an alternating signal, which has a phase reversed by 180° with respect to an alternating signal applied to one of excitation electrodes adjacent to corresponding one of the plurality of detection electrodes, to another of the excitation electrodes adjacent to the corresponding one of the plurality of detection electrodes.

(8) The embedded touch screen according to any one of Items (1) to (6), in which the detection circuit obtains a difference between the signal excited by the corresponding one of the plurality of detection electrodes and an alternating signal in the same phase as the alternating signal applied by the application circuit.

(9) An embedded touch screen, including: a first substrate; a second substrate including, on a front surface thereof: a plurality of scanning signal lines extending in a first direction; a plurality of video signal lines extending in a second direction; a plurality of pixels sectioned by the plurality of scanning signal lines and the plurality of video signal lines in matrix being arranged in an image region and each including a pixel electrode connected to corresponding one of the plurality of video signal lines via a switching element connected to corresponding one of the plurality of scanning signal lines; and a common electrode; a liquid crystal layer sandwiched between the first substrate and the second substrate; an application circuit for applying an alternating signal to a plurality of excitation electrodes; and a detection circuit for detecting a signal excited on a plurality of first detection electrodes each arranged along the first direction, and for detecting a signal excited on a plurality of second detection electrodes each arranged along the second direction.

(10) The embedded touch screen according to Item (9), in which adjacent two of the plurality of excitation electrodes has a clearance therebetween, the clearance extending in at least one of the first direction and the second direction, and in which at least one of each of the plurality of first detection electrodes and each of the plurality of second detection electrodes is arranged at a position overlapping with the clearance in plan view.

(11) The embedded touch screen according to Item (9), in which the plurality of excitation electrodes include: a plurality of first excitation electrodes each arranged along the first direction; and a plurality of second excitation electrodes each arranged along the second direction, and in which the plurality of first detection electrodes are each arranged adjacent to each of the plurality of first excitation electrodes, and the plurality of second detection electrodes are each arranged adjacent to each of the plurality of second excitation electrodes.

(12) The embedded touch screen according to any one of Items (9) to (11), in which the plurality of excitation electrodes, the plurality of first detection electrodes, and the plurality of second detection electrodes each include at least one of the pixel electrode, the common electrode, each of the plurality of video signal lines, and a video signal shielding electrode provided in parallel to the each of the plurality of video signal lines in an overlapping manner.

(13) The embedded touch screen according to any one of Items (9) to (12), in which, during application by the application circuit and detection by the detection circuit, the detection circuit simultaneously detects the signals excited on the plurality of first detection electrodes in the second direction, and simultaneously detects the signals excited on the plurality of second detection electrodes in the first direction.

(14) The embedded touch screen according to any one of Items (9) to (12), in which, during application by the application circuit and detection by the detection circuit, the detection circuit detects the signals excited on the plurality of first detection electrodes through scanning in the second direction, and detects the signals excited on the plurality of second detection electrodes through scanning in the first direction.

(15) The embedded touch screen according to any one of Items (9) to (14), in which the plurality of excitation electrodes, the plurality of first detection electrodes, and the plurality of second detection electrodes each cross a part of the plurality of pixels in a width direction orthogonal to an arrangement direction thereof.

(16) The embedded touch screen according to Item (15), in which a pitch between corresponding one of excitation electrodes and corresponding one of the plurality of first detection electrodes, which are adjacent to each other, and a pitch between corresponding one of the excitation electrodes and corresponding one of the plurality of second detection electrodes, which are adjacent to each other, are larger than a distance between a front surface of the first substrate and the front surface of the second substrate.

(17) The embedded touch screen according to any one of Items (9) to (16), in which the application circuit applies an alternating signal, which has a phase reversed by 180° with respect to an alternating signal applied to one of excitation electrodes adjacent to corresponding one of the plurality of first detection electrodes, to another of the excitation electrodes adjacent to the corresponding one of the plurality of first detection electrodes, and in which the application circuit applies an alternating signal, which has a phase reversed by 180° with respect to an alternating signal applied to one of excitation electrodes adjacent to corresponding one of the plurality of second detection electrodes, to another of the excitation electrodes adjacent to the corresponding one of the plurality of second detection electrodes.

(18) The embedded touch screen according to any one of Items (9) to (16), in which the detection circuit obtains a difference between the signals excited on the plurality of first detection electrodes and an alternating signal having the same phase as the alternating signal applied by the application circuit, and obtains a difference between the signals excited on the plurality of second detection electrodes and the alternating signal having the same phase as the alternating signal applied by the application circuit.

(19) The embedded touch screen according to any one of Items (1) to (18), further including a video display circuit for writing a video signal into the pixel electrode, in which the video signal is updated in a period corresponding to a frame, the frame including: a writing period in which the video display circuit writes the video signal; and a detection period in which the application by the application circuit and the detection by the detection circuit are performed, and in which, during the detection period, one of causing the pixel electrode to hold a signal for black display and turning OFF a backlight unit is performed.

(20) The embedded touch screen according to any one of Items (1) to (18), further including a video display circuit for writing a video signal into the pixel electrode, in which the video signal is updated in a period corresponding to a frame, the frame including: a writing period in which the video display circuit writes the video signal; and a detection period in which the application by the application circuit and the detection by the detection circuit are performed, and in which, during the detection period, the pixel electrode holds the video signal, and one of the alternating signal applied by the application circuit and a signal excited by the alternating signal is superimposed to the pixel electrode.

According to the aspect of Item (1) of the present invention, it is possible to provide the embedded touch screen which is capable of performing coordinate detection with sufficient accuracy by the detection circuit simpler than that in the conventional technology without reduction of the pixel aperture ratio.

According to the aspect of Item (2) of the present invention, the embedded touch screen can be obtained without significantly changing the circuit configuration of the existing liquid crystal display device.

According to the aspect of Item (3) of the present invention, the coordinate detection can be performed in a shorter period of time.

According to the aspect of Item (4) of the present invention, the coordinate detection can be performed by the detection circuit in a smaller size.

According to the aspect of Item (5) or (6) of the present invention, the coordinate detection can be performed even in a small-sized or high resolution embedded touch screen.

According to the aspect of Item (7) or (8) of the present invention, it is possible to obtain the embedded touch screen which is less affected by noise and has high detection sensitivity.

According to any one of the aspects of Items (9) to (11) of the present invention, it is possible to provide the embedded touch screen which is capable of performing coordinate detection with sufficient accuracy by the detection circuit simpler than that in the conventional technology without reduction of the pixel aperture ratio.

According to the aspect of Item (12) of the present invention, the embedded touch screen can be obtained without significantly changing the circuit configuration of the existing liquid crystal display device.

According to the aspect of Item (13) of the present invention, the coordinate detection can be performed in a shorter period of time.

According to the aspect of Item (14) of the present invention, the coordinate detection can be performed by the detection circuit in a smaller size.

According to the aspect of Item (15) or (16) of the present invention, the coordinate detection can be performed even in a small-sized or high resolution embedded touch screen.

According to the aspect of Item (17) or (18) of the present invention, it is possible to obtain the embedded touch screen which is less affected by noise and has high detection sensitivity.

According to the aspect of Item (19) of the present invention, the coordinate detection can be performed without affecting an image to be displayed.

According to the aspect of Item (20) of the present invention, the coordinate detection can be performed without decreasing brightness of an image to be displayed.

DETAILED DESCRIPTION OF THE INVENTION

First, the basic principle of an embedded touch screen according to each embodiment of the present invention is described with reference to FIGS. 1 and 2.

Figure 1:
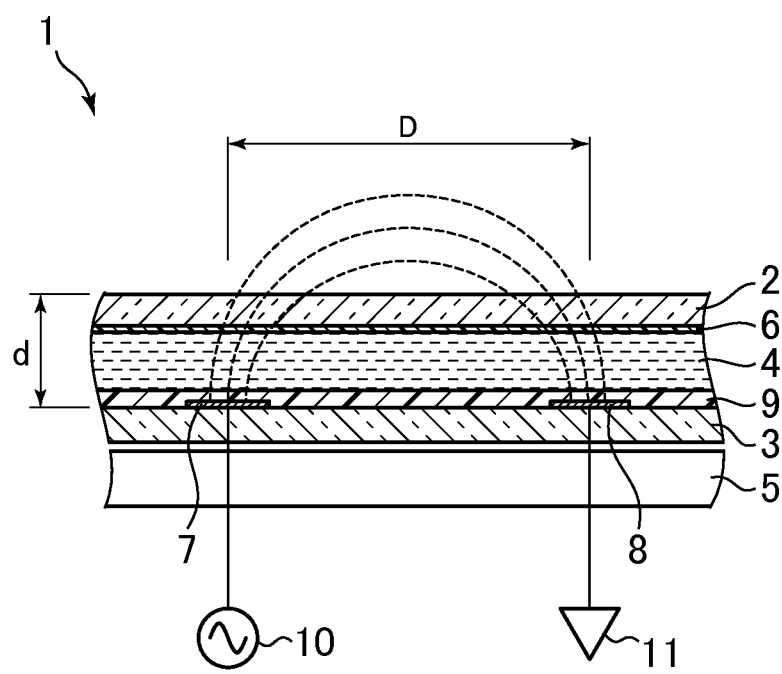
FIG. 1 is a schematic sectional view illustrating the principle of an embedded touch screen according to the present invention.
Figure 2:
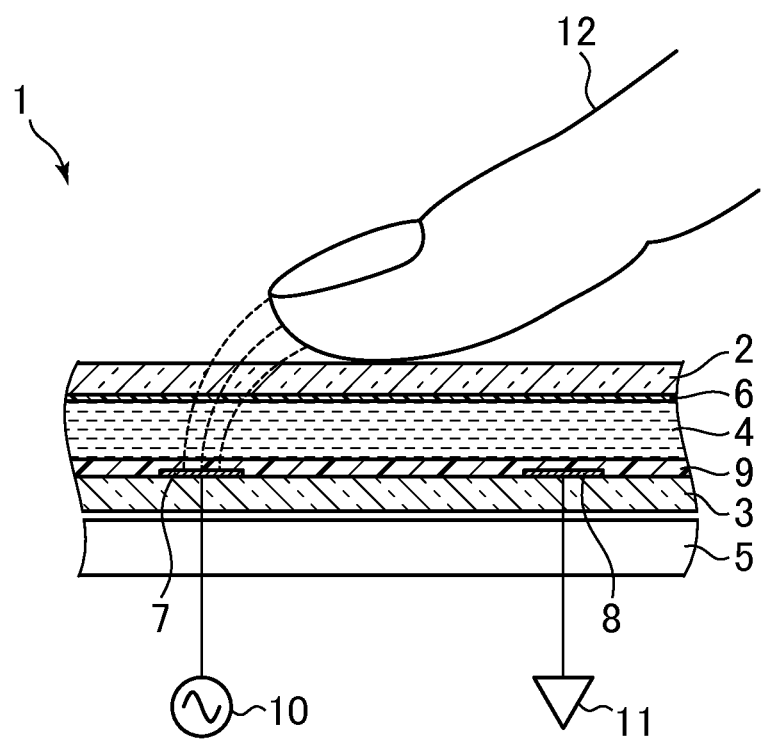
FIG. 2 is a schematic sectional view illustrating the principle of the embedded touch screen according to the present invention.

FIG. 1 is a schematic sectional view illustrating the principle of an embedded touch screen 1 according to the present invention. In FIG. 1, an image displayed on the embedded touch screen 1 is observed by an observer from the upper side of FIG. 1. The embedded touch screen 1 has a configuration of a general liquid crystal display device, and includes a liquid crystal panel arranged on the observer's side and a backlight unit 5 as a planar light source arranged on the rear surface side of the liquid crystal panel. The liquid crystal panel has a structure in which a liquid crystal layer 4 is sandwiched between a first substrate 2 and a second substrate 3, which are transparent substrates made of glass or the like. In the following, a surface of the embedded touch screen 1, which faces the observer's side, is referred to as a "front surface", and a surface on the opposite side is referred to as a "rear surface". Further, the observer's side is called a "front surface side", and the opposite side is called a "rear surface side".

An insulating layer 6 is formed on the rear surface of the first substrate 2. The insulating layer 6 includes a color filter layer, an alignment film, and the like, although illustration of detailed configurations thereof is omitted in FIG. 1. Therefore, the first substrate 2 is generally called a color filter substrate. Further, in a case where the embedded touch screen 1 is also an active matrix liquid crystal display device, on the front surface of the second substrate 3, there are formed electrical structures such as TFTs as switching elements, various wirings, and various electrodes for controlling the alignment direction of a liquid crystal material in the liquid crystal layer 4. In this case, those electrical structures are schematically illustrated simply by electrodes denoted by reference numerals 7 and 8. The electrodes denoted by reference numerals 7 and 8 and other electrical structures are covered with an insulating layer 9. The insulating layer 9 includes a general insulating film, a general alignment film, and the like, although illustration of detailed configurations thereof is omitted in FIG. 1.

In this case, the electrode denoted by reference numeral 7 is an excitation electrode 7 which is connected to an alternating power source 10 and to which an alternating signal is applied by the same circuit. Note that, the "alternating signal" as used herein refers to a current or a voltage that periodically changes its magnitude and direction, and may have any waveform. In this specification, a sine wave AC voltage is hereinafter used as the representative alternating signal, but the present invention is not limited thereto. On the other hand, the electrode denoted by reference numeral 8 is a detection electrode 8 arranged adjacent to the excitation electrode 7. The detection electrode 8 is connected to an amplifier 11 for amplifying a signal, that is, a voltage or a current excited by the detection electrode 8, and detects the amplification result. In this case, as an example, the amplifier 11 amplifies the voltage excited by the detection electrode 8.

In this case, an electric field excited by the alternating signal applied to the excitation electrode 7 is an alternating electric field. The line of electric force of the alternating electric field is indicated by broken lines in FIG. 1, and is illustrated from the excitation electrode 7 to protrude from the first substrate on the front surface side and connect to the detection electrode 8. At this time, a signal excited by this alternating electric field is generated in the detection electrode 8. In this case, when a user of the embedded touch screen 1 touches the front surface of the first substrate 2 with a finger 12, a stylus, or other conductive members, as illustrated in FIG. 2, the alternating electric field between the excitation electrode 7 and the detection electrode 8 is blocked, and the level of the signal excited on the detection electrode 8 is reduced. Through detection of a change in level of this signal amplified by the amplifier 11, it is detected that the user has touched the front surface of the embedded touch screen 1. Further, based on the position of the detection electrode 8 at which the signal level has changed, the position where the user has touched is detected, that is, coordinate detection is performed.

By the way, when contact detection and coordinate detection are performed by the principle described above, as illustrated in FIG. 1, the alternating electric field to be excited by the excitation electrode 7 is required to protrude from the first substrate 2 on the front surface side. As a first condition therefor, an electrode that prevents the alternating electric field from protruding on the front surface side cannot be formed on the first substrate 2. That is, an electrode that becomes a so-called Faraday cage, which blocks the electric field, cannot be formed on the first substrate 2. Generally, the liquid crystal display device controls the alignment direction of the liquid crystal by an electric field formed between a pixel electrode and a common electrode. Depending on the liquid crystal driving system, the common electrode may be formed on the first substrate or on the second substrate. The common electrode formed on the first substrate becomes a Faraday cage, and hence the present invention is required to adopt a mode in which the common electrode is formed on the second substrate 3. That is, the pixel electrode and the common electrode are formed on the front surface of the second substrate 3. As a representative system of driving the liquid crystal in such a mode, there is known an in-plane switching (IPS) system. In this specification, the embedded touch screen 1 is an IPS-system liquid crystal display device.

As a second condition, a pitch between the excitation electrode 7 and the detection electrode 8 requires to be sufficiently large. When the pitch therebetween is small, the alternating electric field remains inside the embedded touch screen 1 and hardly protrudes from the first substrate 2 on the front surface side. Specifically, it is required that a pitch D between the excitation electrode 7 and the detection electrode 8 be at least larger than a distance d from the front surface of the first substrate 2 to the front surface of the second substrate 3.

Note that, the excitation electrode 7 and the detection electrode 8 described herein are merely named for convenience focusing on the functions when the embedded touch screen 1 performs contact detection and coordinate detection in order to discriminate the electrodes. Therefore, it is not always necessary to provide dedicated electrodes therefor. Some electrodes necessary for the embedded touch screen 1 to function as the liquid crystal display device may be used to serve as the excitation electrode 7 and the detection electrode 8. In this manner, the embedded touch screen 1 can be obtained without significantly changing the circuit configuration of the existing liquid crystal display device. Examples of such electrodes includes the pixel electrode, the common electrode, a video signal line, and a video signal shielding electrode provided in parallel to the video signal line in an overlapping manner. Each of the excitation electrode 7 and the detection electrode 8 may be formed of any one of those electrodes, or may include a plurality of those electrodes. Further, both of the excitation electrode 7 and the detection electrode 8 may be formed of the same electrode (for example, pixel electrode).

Note that, as illustrated in FIG. 1, the alternating electric field excited by the excitation electrode 7 passes through the liquid crystal layer 4, and hence the alternating electric field may affect the alignment direction of the liquid crystal. Therefore, the alternating signal applied to the excitation electrode 7 by the alternating power source 10 is set to have a frequency that is equal to or larger than a frequency at an extent that does not cause response of the liquid crystal in the liquid crystal layer 4. In this manner, the influence on the liquid crystal due to the alternating electric field is substantially eliminated. The frequency at which the liquid crystal may respond cannot be categorically determined because the frequency varies depending on the composition of the liquid crystal, the thickness of the liquid crystal layer 4, and external factors such as temperature, but it is generally considered that no response is made when the frequency of the electric field to be applied is equal to or larger than about 1 kHz. Therefore, the lower limit of the frequency of the alternating signal in the present invention is equal to or larger than 1 kHz, preferably equal to or larger than 10 kHz. On the other hand, ideally, there is no upper limit in the frequency of the alternating signal, but actually, the upper limit is determined by various factors, for example, the detection limit of the amplifier 11 and the cutoff frequency of the TFT. Therefore, considering the technology of manufacturing the embedded touch screen 1, that is, the liquid crystal display device at present time, the upper limit of the alternating signal is about 10 MHz to 20 MHz.

Note that, in the description above, the first substrate 2 is arranged on the observer's side, but the present invention is not always limited thereto, and the second substrate 3 may be arranged on the observer's side. In this case, the above-mentioned first condition is not always necessary to be satisfied, and appropriate electrodes may be formed on the first substrate 2. When such an arrangement is taken, a liquid crystal driving system of a mode in which the common electrode is formed on the first substrate 2, for example, a twisted nematic (TN) or vertical alignment (VA) system may be employed. Further, regarding the second condition as well, it is only required that the alternating electric field formed between the excitation electrode 7 and the detection electrode 8 pass through the second substrate 3 to protrude on its front surface side, and that the pitch D be at least larger than the thickness of the second substrate 3.

In the following, based on the above-mentioned principle, examples of the specific configuration of the embedded touch screen 1 are described by means of embodiments.

[Embodiment 1]

Figure 3:
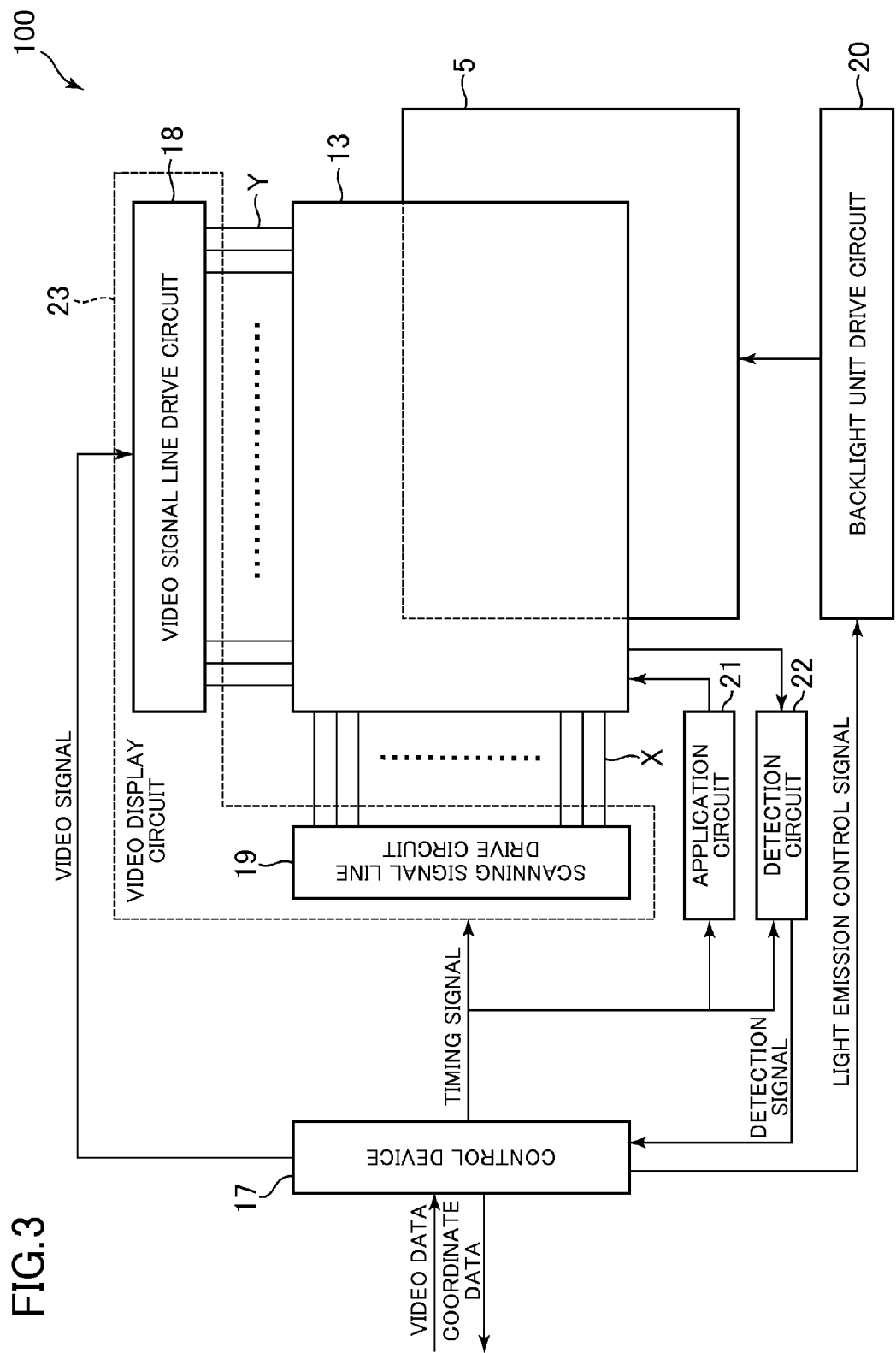
FIG. 3 is a view illustrating a configuration of an embedded touch screen according to Embodiment 1 of the present invention.

FIG. 3 is a view illustrating a configuration of an embedded touch screen 100 according to Embodiment 1 of the present invention.

A liquid crystal panel 13 has a rectangular shape, and has lateral and vertical lengths determined depending on the application of the embedded touch screen 100. The liquid crystal panel 13 illustrated in FIG. 3 has a laterally long shape (the lateral length is larger than the vertical length). However, the shape of the liquid crystal panel 13 is not limited thereto, and the liquid crystal panel 13 may have a vertically long shape (the lateral length is smaller than the vertical length), or the lateral length may be the same as the vertical length.

On the second substrate 3 of the liquid crystal panel 13, a plurality of video signal lines Y and a plurality of scanning signal lines X are formed. The video signal line Y and the scanning signal line X are provided orthogonal to each other, and are formed into a lattice shape. A region surrounded by two adjacent video signal lines Y and two adjacent scanning signal lines X corresponds to one pixel.

Figure 4:
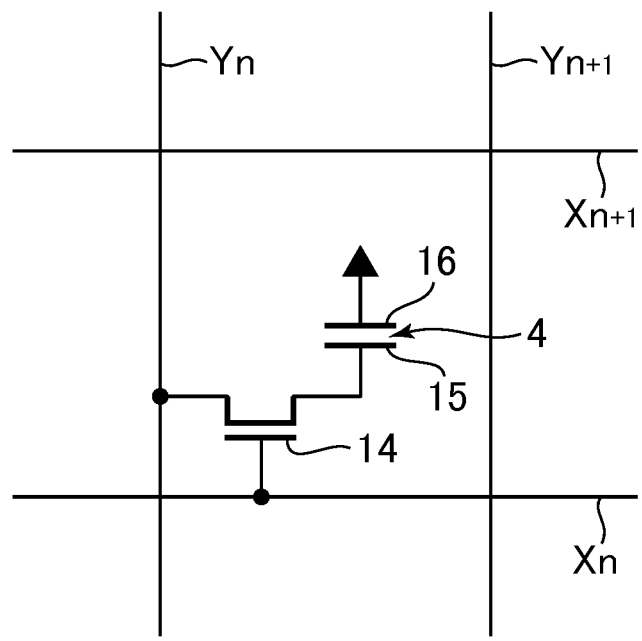
FIG. 4 illustrates one of pixels formed in a liquid crystal panel by a circuit diagram.

FIG. 4 illustrates one of the pixels formed in the liquid crystal panel 13 by a circuit diagram. A region surrounded by video signal lines Yn and Yn+1 and scanning signal lines Xn and Xn+1 as illustrated in FIG. 4 corresponds to one pixel. In this case, it is supposed that the pixel focused here is driven by the video signal line Yn and the scanning signal line Xn. On the second substrate 3 side of each pixel, a TFT 14 is provided. The TFT 14 is turned ON by a scanning signal input from the scanning signal line Xn. The video signal line Yn supplies a voltage (signal indicating a gradation value of each pixel) to a pixel electrode 15 of the pixel via the TFT 14 in the ON state.

Further, similarly on the second substrate 3 side, on the other hand, a common electrode 16 is formed so as to form a capacitor via the liquid crystal layer 4 sealed and sandwiched between the first substrate 2 and the second substrate 3. The common electrode 16 is electrically connected to a common potential. Therefore, the electric field generated between the pixel electrode 15 and the common electrode 16 is changed in accordance with a voltage applied to the pixel electrode 15, to thereby change the alignment state of the liquid crystal in the liquid crystal layer 4. Thus, a polarized state of the light beam passing through the liquid crystal panel 13 is controlled. Further, a polarization filter is adhered to each of the front surface and the rear surface of the liquid crystal panel 13. With this, each of the pixels formed in the liquid crystal panel 13 functions as an element for controlling the light transmittance. Further, the transmittance of light of each pixel is controlled in accordance with input image data, to thereby form an image. Therefore, in the liquid crystal panel 13, a region in which the pixels are formed corresponds to an image region in which an image is to be formed.

Referring back to FIG. 3, an external device inputs video data to a control device 17. The control device 17 may be a micro computer including a central processing unit (CPU), and a non-volatile/volatile storage element such as a read only memory (ROM) and a random access memory (RAM). The control device 17 is configured to perform various types of image processing such as color adjustment with respect to the input video data, generate a video signal indicating a gradation value of each pixel, control contact detection and coordinate detection to be performed by the embedded touch screen 100 as described later, and output coordinate data obtain as a result to an external device.

The control device 17 outputs the generated video signal to a video signal line drive circuit 18. Further, the control device 17 generates, based on the input video data, a timing signal for synchronizing the video signal line drive circuit 18, a scanning signal line drive circuit 19, a backlight unit drive circuit 20, an application circuit 21, and a detection circuit 22, and outputs the generated timing signal to the respective circuits. Note that, the physical form of the control device 17 is not particularly limited, and the control device 17 may be formed of a plurality of large scale integrations (LSIs) or a single member. Further, the backlight unit drive circuit 20 and other circuits may not be synchronized to each other.

The backlight unit drive circuit 20 is a circuit for supplying a necessary current to the backlight unit 5. In this embodiment, the control device 17 generates, based on the input video data, a signal for controlling the brightness of the backlight unit 5, and outputs the generated signal to the backlight unit drive circuit 20. Then, the backlight unit drive circuit 20 controls the amount of current to be supplied to the backlight unit 5 in accordance with the generated signal and the timing signal if necessary, and adjust the brightness of the backlight unit 5. Note that, the brightness of the backlight unit 5 may be adjusted for each of regions in the backlight unit 5. As a light source of the backlight unit 5, any known light source may be used. When a light emitting diode is used as the light source, as a method of controlling the brightness, there may be employed a pulse width modulation (PWM) method in which the current amount is set constant and the brightness is controlled by a light emission period. Alternatively, no control may be made on the brightness of the light emitting diode, and the current amount may be set constant so that light is emitted at a constant light intensity.

The scanning signal line drive circuit 19 is connected to the scanning signal lines X. The scanning signal line drive circuit 19 selects the scanning signal lines X in order in accordance with the timing signal input from the control device 17, and applies a voltage to the selected scanning signal line X. When the voltage is applied to the scanning signal line X, the TFT 14 connected to the scanning signal line X is turned ON.

The video signal line drive circuit 18 is connected to the video signal lines Y. The video signal line drive circuit 18 applies a voltage corresponding to the video signal indicating the gradation value of each pixel to each of the TFTs 14 connected to the selected scanning signal line X in conformity to the selection of the scanning signal line X by the scanning signal line drive circuit 19.

Note that, in this embodiment, the control device 17 and the backlight unit drive circuit 20 illustrated in FIG. 3 are formed on a control board (not shown). Further, a video display circuit 23 including the video signal line drive circuit 18 and the scanning signal line drive circuit 19, the application circuit 21, and the detection circuit 22 are formed on a flexible printed circuit (FPC) board electrically connected to the liquid crystal panel 13, or on a substrate forming the liquid crystal panel 13 (so-called system on glass (SOG)). Note that, those arrangements are merely examples, and positions where the respective circuits are provided are arbitrary. The application circuit 21 and the detection circuit 22 are described later. The application circuit 21 and the detection circuit 22 are circuits including an alternating power source 10 and an amplifier 11, respectively (see FIGS. 1 and 2).

Figure 5:
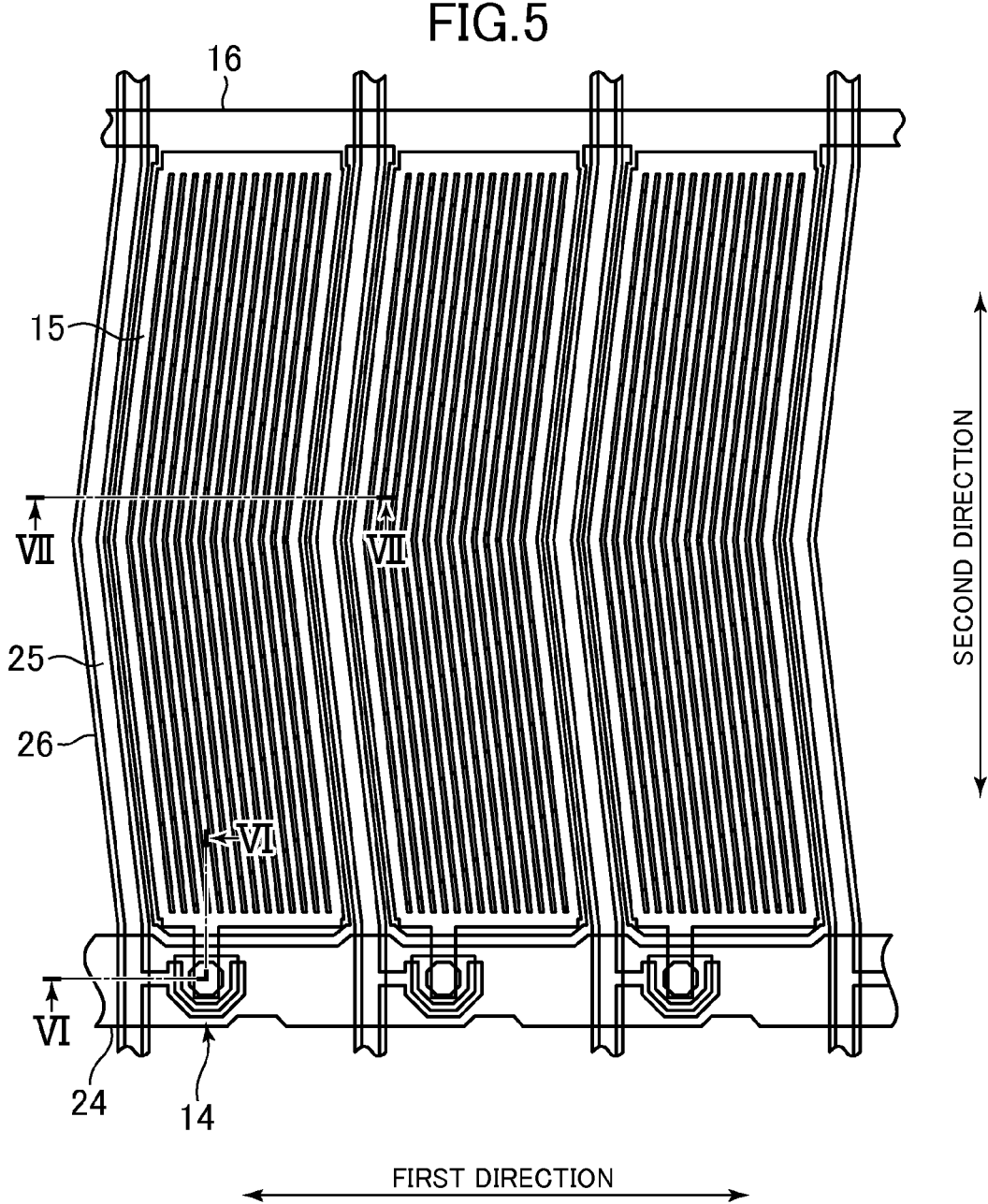
FIG. 5 is a partially enlarged plan view of a second substrate of the embedded touch screen.

FIG. 5 is a partially enlarged plan view of the second substrate 3 of the embedded touch screen 100. FIG. 5 illustrates a part including three adjacent pixels, and illustrates a scanning signal line 24, a video signal line 25, the pixel electrode 15, the common electrode 16, the TFT 14 formed for each of the pixels, and a video signal shielding electrode 26. Note that, the respective members are stacked on the surface of the second substrate 3 by a known semiconductor manufacturing process, and are arranged so as to overlap with each other through intermediation of insulating layers as appropriate. However, in order to clearly represent the positional relationship, FIG. 5 illustrates outer shapes of the respective members even at overlapping parts.

The scanning signal line 24 is a strip line continuously extending in the lateral direction of FIG. 5, and in this embodiment, is a stacked film of indium tin oxide (ITO) and copper. Further, the video signal line 25 is a strip line formed of a copper thin film, which continuously extends in the vertical direction of FIG. 5 so as to be orthogonal to the scanning signal line 24. In this specification, the direction in which the scanning signal line 24 extends is hereinafter referred to as a "first direction", and the direction in which the video signal line 25 extends is hereinafter referred to as a "second direction". Further, a substantially rectangular region surrounded by the adjacent scanning signal lines 24 and the adjacent video signal lines 25 corresponds to one pixel. Note that, in this embodiment, in order to improve display characteristics, the pixel has not a complete rectangular shape but a bent shape, and the video signal line 25 is not a straight line extending along the second direction but a slightly bent line.

Inside the pixel, the pixel electrode 15 and the common electrode 16 formed at a position overlapping with the pixel electrode 15 are arranged. The pixel electrode 15 is an electrode formed of an ITO thin film having a comb-shaped pattern, and is connected to a source electrode of the TFT 14. The common electrode 16 is formed of an ITO thin film having a solid pattern that covers the entire pixel. The common electrodes 16 adjacent to each other in the first direction are connected to each other. Further, the video signal shielding electrode 26 is a strip line which is formed right above the video signal line 25 in parallel thereto in an overlapping manner, and is formed of an ITO thin film extending in the second direction. The video signal shielding electrode 26 is maintained to a common potential during image display, and has a function of electrically shielding the video signal line 25 so that a noise electric field from the video signal line 25 does not reach the pixel electrode 15. Thus, the video signal shielding electrode 26 prevents deterioration of an image due to a crosstalk. Note that, the video signal shielding electrode 26 is not an essential configuration, and may be omitted if unnecessary.

Figure 6:
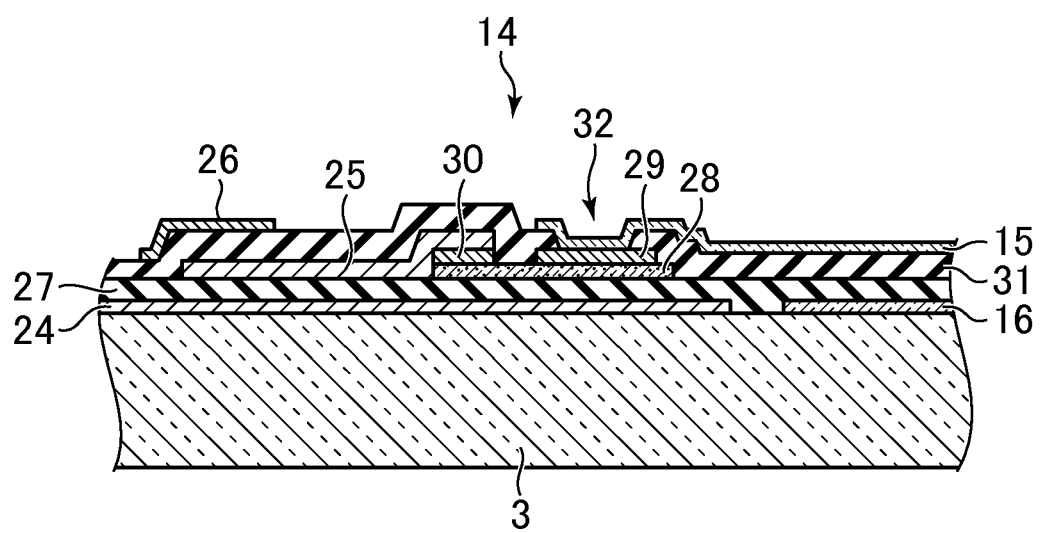
FIG. 6 is a sectional view taken along the line VI-VI of FIG. 5.

FIG. 6 is a sectional view taken along the line VI-VI of FIG. 5. FIG. 6 illustrates a cross-section of the TFT 14. A gate insulating film 27 made of SiN is formed so as to cover the scanning signal line 24 and the common electrode 16 formed on the second substrate 3. On the gate insulating film 27, a semiconductor layer 28 made of hydrogenated amorphous silicon (a-Si:H) is formed. On the semiconductor layer 28, a source electrode 29 and a drain electrode 30 are formed so as to be separated from each other in plan view. Each of the source electrode 29 and the drain electrode 30 is formed by stacking, on an n+ type hydrogenated amorphous silicon film doped with phosphorus, a metal film such as a stacked member of copper and molybdenum as necessary. With the scanning signal line 24 that functions as the gate electrode, the gate insulating film 27, the semiconductor layer 28, the source electrode 29, and the drain electrode 30, the TFT 14 is formed.

The video signal line 25 is connected to the drain electrode. Further, a protective insulating film 31 made of SiN is formed so as to cover an overall region including the TFT 14 and the video signal line 25. On the protective insulating film 31, the pixel electrode 15 is formed. The pixel electrode 15 and the source electrode 29 are connected to each other via a through hole 32. Further, at a position overlapping with the video signal line 25 across the protective insulating film 31, the video signal shielding electrode 26 is formed.

Figure 7:
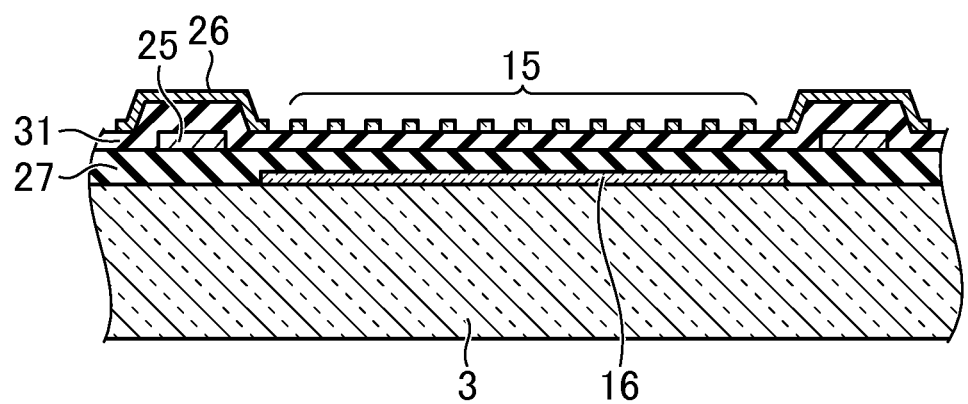
FIG. 7 is a sectional view taken along the line VII-VII of FIG. 5.

FIG. 7 is a sectional view taken along the line VII-VII of FIG. 5. FIG. 7 illustrates a cross-section of a light transmissive region of the pixel, and illustrates the pixel electrode 15 having the comb-shaped pattern and the common electrode 16 formed below the pixel electrode 15. When charges are supplied to the pixel electrode 15 to write a predetermined voltage therein, an electric field in a substantially horizontal direction is formed between the pixel electrode 15 and the common electrode 16, thereby controlling the alignment direction of the liquid crystal. This type of liquid crystal driving system corresponds to the IPS system, which has characteristics of fast liquid crystal response and wide viewing angle. Further, FIG. 7 illustrates a state in which the video signal shielding electrode 26 is formed so as to be overlapped with and insulated from the video signal line 25 in the same layer as the pixel electrode 15.

Note that, the above configuration described with reference to FIGS. 6 and 7 is equivalent to that in a general IPS-system liquid crystal display device. The materials and shapes of the respective members may be changed arbitrarily by a person skilled in the art as long as the functions thereof are not affected.

Further, in the configuration described above, an important point as the embedded touch screen 100 is that the scanning signal line 24 and the common electrode 16 are shaped to extend in the first direction, and the video signal line 25 and the video signal shielding electrode 26 are shaped to extend in the second direction. Further, the pixel electrode 15 is connected to the video signal line 25 via the TFT 14, and the TFTs 14 arranged in the first direction are turned ON or OFF at the same time by a signal from the scanning signal line 24. The TFTs 14 arranged in the second direction are connected to the same video signal line 25.

Figure 8:
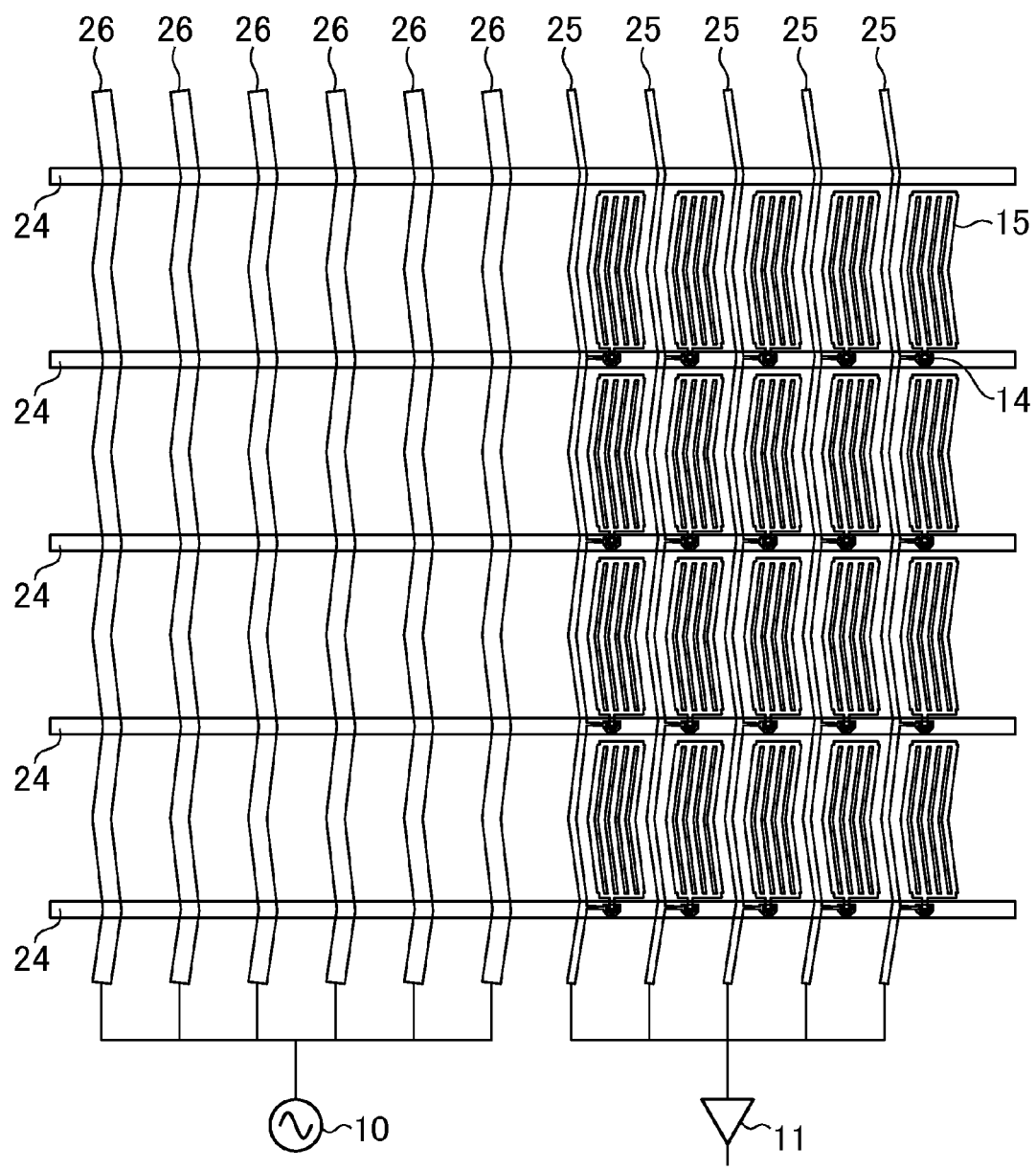
FIG. 8 is a view schematically illustrating a partial configuration of the embedded touch screen according to Embodiment 1 of the present invention for performing contact detection and coordinate detection.

FIG. 8 is a view schematically illustrating a partial configuration of the embedded touch screen 100 according to this embodiment for contact detection and coordinate detection. FIG. 8 illustrates merely members contributing to contact detection and coordinate detection among circuits formed on the second substrate 3, and illustration of other parts is omitted.

The six video signal shielding electrodes 26 illustrated on the left side in FIG. 8 are short-circuited to each other and integrally connected to the alternating power source 10, thereby functioning as an excitation electrode. On the other hand, the pixel electrodes 15 arranged in four rows and five columns on the right side in FIG. 8 (representative one of those is denoted by a reference numeral in FIG. 8) integrally function as a detection electrode. That is, the TFTs 14 connected to the respective pixel electrodes 15 illustrated in FIG. 8 are turned ON, and further, the video signal lines 25 arranged in five columns are short-circuited to each other to be integrally connected to the amplifier 11. As a result, a voltage excited on the pixel electrode 15 illustrated in FIG. 8 passes through the video signal line 25 to be amplified by the amplifier 11, and is read outside.

In this embodiment, the excitation electrode is formed of the video signal shielding electrodes 26 extending in the second direction. Further, the excitation electrode covers a plurality of pixels in a width direction orthogonal to the second direction corresponding to the arrangement direction thereof, that is, the first direction. Specifically, the six video signal shielding electrodes 26 covering six pixels are collected to be used as one excitation electrode. Further, the detection electrode is set similarly, and the detection electrode covers a plurality of pixels in a width direction orthogonal to the second direction corresponding to a direction in which the pixel electrodes 15 forming the detection electrode are arranged, that is, the first direction. In this embodiment, the pixel electrodes 15 covering five pixels are collected to be used as one detection electrode.

The reason is as follows. As described above, a large pitch is taken between the excitation electrode and the detection electrode so that the alternating electric field protrudes from the first substrate 2 on the front surface side. At present time, generally, the thickness of the liquid crystal layer 4 is normally 3 μm to 5 μm, and the thickness of the first substrate 2 is about 0.5 mm to 0.7 mm. Therefore, the size of each of the excitation electrode and the detection electrode in the adjacent direction thereof is required to be set equivalent thereto. It is not very realistic to newly provide an electrode having such a size in view of the function of the embedded touch screen 1 as the liquid crystal display device. Therefore, as in this embodiment, a plurality of existing electrodes are collected so as to cover a plurality of pixels in the width direction orthogonal to the arrangement direction of the excitation electrode or the detection electrode, and the collected electrodes are short-circuited and integrally used. In this manner, the electrodes in a large area are effectively combined. The number of electrodes to be collected, that is, the number of pixels to be covered cannot be categorially determined because the number thereof depends on the size of the pixel and the desired accuracy of coordinate detection. However, in order to obtain an electrode of 0.5 mm to 0.7 mm as described above, in a case where the embedded touch screen 100 includes the liquid crystal panel 13 supporting full-color display, which includes sub-pixels of RGB, in the first direction, it is preferred to collect three columns or more in sub-pixel unit, and it is more preferred to collect six columns or more. In the second direction, it is preferred to collect two rows or more in sub-pixel unit, and it is more preferred to collect four rows or more.

Figure 9:
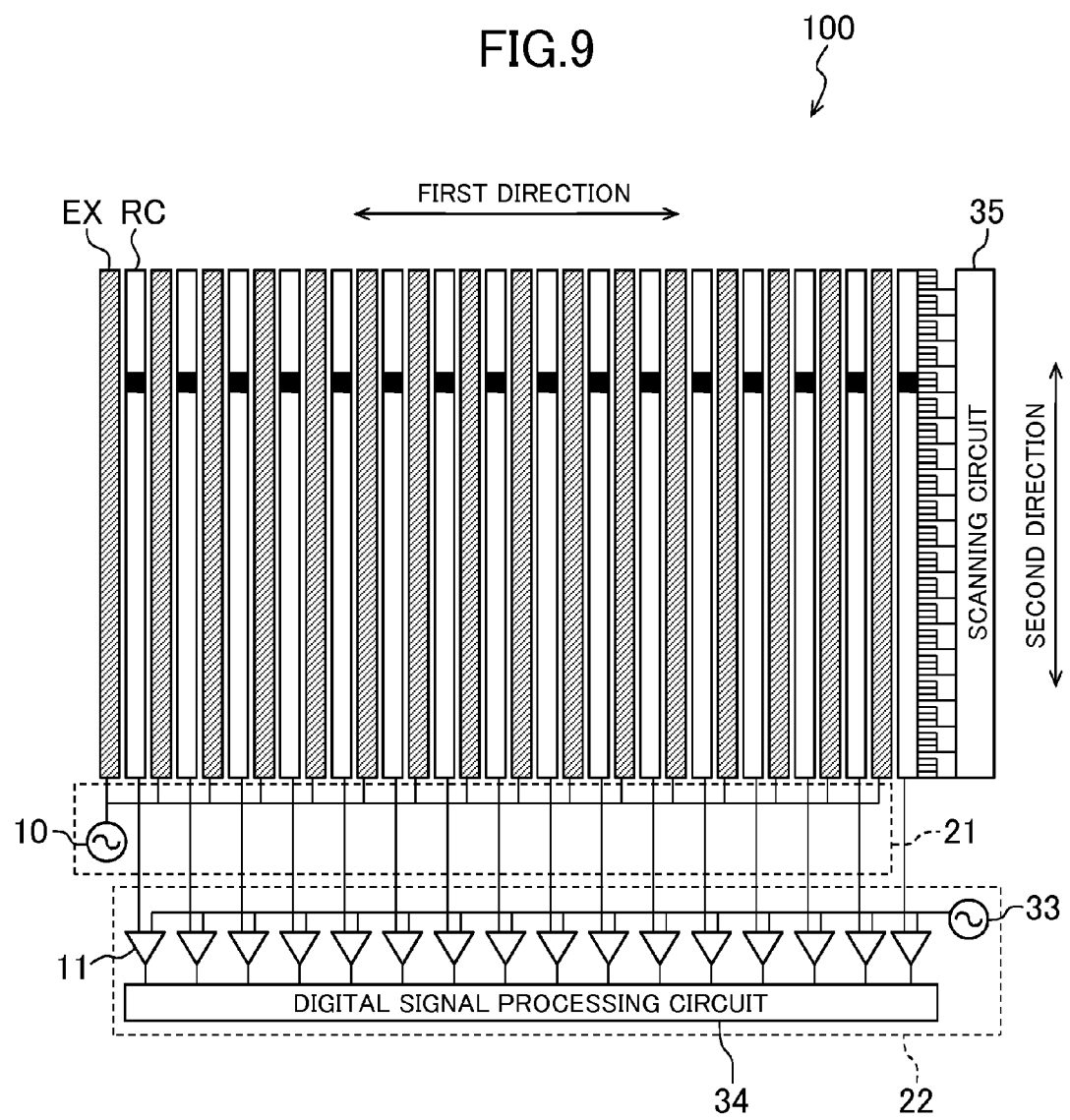
FIG. 9 is a view schematically illustrating an overall configuration of the embedded touch screen according to Embodiment 1 of the present invention for performing contact detection and coordinate detection.

FIG. 9 is a view schematically illustrating an overall configuration of the embedded touch screen 100 according to this embodiment for contact detection and coordinate detection. On the second substrate 3 of the embedded touch screen 100 in the image region, the excitation electrodes denoted by reference symbol EX and the detection electrodes denoted by reference symbol RC are alternately arranged in the first direction. Further, each of the excitation electrode EX and the detection electrode RC has a shape extending long in the second direction that is the arrangement direction. Note that, in order to distinguish those electrodes, the excitation electrode EX is illustrated with hatching.

In this case, specifically, the excitation electrode EX is obtained by collecting a plurality of video signal shielding electrodes 26 as described above, but those collected video signal shielding electrodes 26 are here treated as one excitation electrode EX for convenience. Similarly, the detection electrode RC is obtained by collecting a plurality of pixel electrodes 15, but those collected pixel electrodes 15 are treated as one detection electrode RC.

The application circuit 21 is connected to the excitation electrodes EX, and an alternating signal from the alternating power source 10 is applied to each of the excitation electrodes EX. The detection circuit 22 is connected to the detection electrodes RC. In the detection circuit 22, a signal excited on the detection electrode RC and a signal from a second alternating power source 33 are input to the amplifier 11, and a difference of the signals is amplified to be input to a digital signal processing circuit 34. In this case, the second alternating power source 33 outputs an alternating signal in the same phase as the alternating power source 10, and is adjusted so that the signal excited on the detection electrode RC is cancelled for minimum output under a state in which a finger or the like is not brought into contact with the front surface of the embedded touch screen 100. This configuration is set for increasing the sensitivity and accuracy of contact detection. Note that, when there is no particular problem, the alternating power source 10 may serve as the second alternating power source. Further, the digital signal processing circuit 34 outputs coordinates at which the contact is detected as a digital signal based on the amplified signal from the amplifier 11, and may include a low-pass filter, an integration circuit, an A/D conversion circuit, a comparator, and other appropriate circuits for signal processing.

In the configuration described above, the change in signal from one of the plurality of prepared amplifiers 11 is detected to perform, simultaneously to contact detection, coordinate detection in the first direction, that is, contact position detection. However, in this state, coordinate detection in the second direction cannot be performed. Therefore, in this embodiment, a scanning circuit 35 is provided, and the detection electrode RC is time-divided in the second direction. In this manner, from the timing at which contact is detected, coordinate detection in the second direction is performed. The scanning circuit 35 is connected to the scanning signal lines 24, and sequentially applies a signal for turning ON the TFT 14 to the scanning signal lines 24, to thereby perform scanning in the second direction. In this case, as illustrated in FIG. 9, the scanning by the scanning circuit 35 need not be performed for a unit of each one pixel but a unit of a plurality of pixels. In the example illustrated in FIG. 9, four pixels are collected to be sequentially scanned.

Therefore, at a certain timing, for example, when the alternating signals are applied to the excitation electrodes EX, and further, when a signal for turning ON the TFT 14 is applied by the scanning circuit 35 to the scanning signal line 24 at the fifth row from the top of FIG. 9 in the scanning unit, in the detection electrodes RC, only the pixel electrodes 15 illustrated as black parts in FIG. 9 are short-circuited to the video signal lines 25, and signals therefrom are input to the respective amplifiers 11. When there is a change in signal output from any one of the amplifiers 11 at this timing, the contact position in the first direction is determined based on the position of the amplifier 11 at which the change has been detected, and further, the contact position in the second direction is determined based on the position of the fifth scanning unit from the top. As a result, coordinate detection is performed. Note that, the scanning circuit 35 may be separately provided from the scanning signal line drive circuit 19 (see FIG. 3), or the scanning circuit 35 may serve as the scanning signal line drive circuit 19.

Note that, the "scanning" as used herein refers to an operation of sequentially selecting only one target once at a time with respect to all targets continuously arranged, and the selection may be performed in any order. Generally, the "scanning" often refers to an operation of sequentially selecting one of all targets continuously arranged in order from the end so that the control or circuit becomes simple. A similar operation is employed also in this embodiment, but the present invention is not limited thereto.

Figure 10:
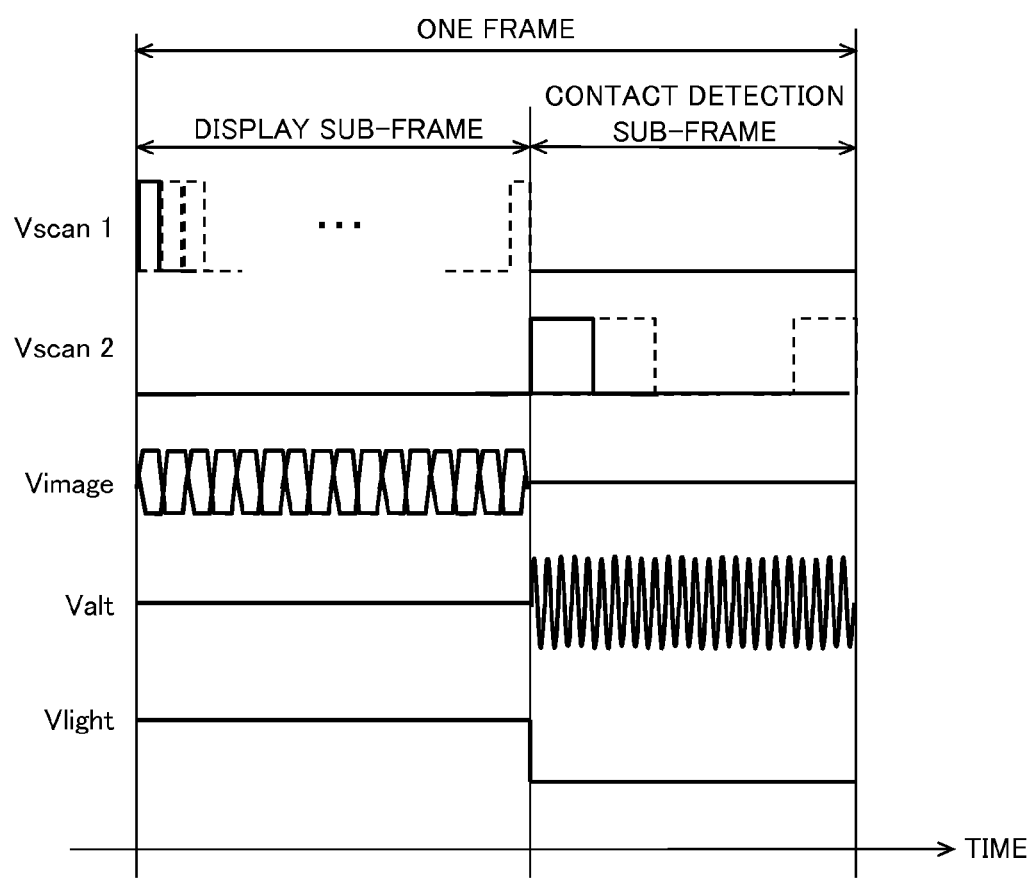
FIG. 10 is a diagram illustrating waveforms of operation signals of the embedded touch screen according to Embodiment 1 of the present invention.

FIG. 10 is a diagram illustrating waveforms of operation signals of the embedded touch screen 100 according to this embodiment. The embedded touch screen 100 sequentially updates an image to be displayed. A period from when one image is displayed to when the next image is displayed is called a frame. Further, in the embedded touch screen 100, the frame is further divided into a display sub-frame and a contact detection sub-frame. The length of one frame depends on the frame frequency. For example, the length thereof is 16.7 ms when the frame frequency is 60 Hz. How to determine the length of the sub-frames is arbitrary. For example, the display sub-frame is set to 12 ms and the contact detection sub-frame is set to 4.7 ms.

The display sub-frame is a period in which the embedded touch screen 100 displays an image, and is also a writing period in which the video display circuit 23 writes a video signal. In the display sub-frame, a scanning signal line drive signal Vscan1 that is a pulse signal for each one row of pixels is sequentially input from the scanning signal line drive circuit 19 (see FIG. 3), and a video signal Vimage is written into the pixel electrode 15. Further, a backlight drive signal Vlight is in an ON state, and thus the backlight unit 5 is turned ON. At this time, a contact detection scanning signal Vscan2 from the scanning circuit 35 and an alternating signal Valt from the application circuit 21 are not supplied.

Note that, it is unimportant to describe the detailed operation of the embedded touch screen 100 as the liquid crystal display device for describing the present invention, and hence the waveforms of the operation signals in the above-mentioned display sub-frame are simplified. Description is made above as if the video signal Vimage is written and the backlight unit 5 is turned ON during the entire period of the display sub-frame. However, for realizing the embedded touch screen 100, the period for writing the video signal Vimage may be a part of the period of the display sub-frame, and further, the backlight unit 5 may be entirely or partially turned OFF in a period in which the video signal Vimage is written.

The contact detection sub-frame is a period in which the embedded touch screen 100 performs contact detection and coordinate detection, and is also a detection period in which application by the application circuit 21 and detection by the detection circuit 22 are performed. In the contact detection sub-frame, supply of the scanning signal line drive signal Vscan1 and the video signal Vimage is stopped, and the alternating signal Valt is supplied to the excitation electrode EX. By stopping the supply of the scanning signal line drive signal Vscan1 and the video signal Vimage during the contact detection sub-frame, it is possible to prevent electromagnetic noises from those signals from affecting contact detection and coordinate detection.

As described above, the alternating signal Valt is desired to have a frequency at which the liquid crystal does not respond, and the frequency is set to 1 kHz or larger, more preferably 10 kHz or larger. On the other hand, in this embodiment, the signal is detected via the TFT 14, and hence the excitation frequency is required to be sufficiently smaller than the cutoff frequency of the TFT 14. The cutoff frequency depends on the type and size of the TFT to be used, and the upper limit of the frequency of Valt differs depending on the design, but in a case of a MOS type TFT generally used at present time, it is preferred that the upper limit of the frequency of Valt be about 100 kHz or smaller in a case of an amorphous silicon TFT that is widely used in a large-sized television set, and about 10 MHz or smaller in a case of a polysilicon TFT that is used in a small-sized display used in mobile devices and the like.

Further, the contact detection scanning signal Vscan2 that is a pulse signal for each scanning unit is sequentially input, and thus the entire embedded touch screen 100 is scanned in the second direction. Further, at this time, the backlight drive signal Vlight is set in an OFF state so that the backlight unit 5 is turned OFF.

The reason is as follows. When the contact detection scanning signal Vscan2 is input, the pixel electrodes 15 included in the scanning unit are short-circuited, and hence the image to be displayed on the embedded touch screen 100 is disturbed. By turning OFF the backlight unit 5, it is possible to prevent deterioration of image caused by the short-circuit. Note that, instead of turning OFF the backlight unit 5, a voltage for black display can be written into the pixel electrode 15 so that a signal for black display is held in the pixel electrode 15.

Alternatively, in the contact detection sub-frame, the pixel electrode 15 may hold the video signal Vimage and a signal excited by the alternating signal Valt may be superimposed to the pixel electrode 15 so that the display of the image is maintained in the contact detection sub-frame as well. In this case, a little ingenuity is required in the circuit, but, in FIG. 9, it is preferred that the detection circuit 22 and the individual pixel electrodes 15 included in the detection electrode RC be connected to each other via a high-pass filter. It is preferred to set the cutoff frequency of the high-pass filter so as to have a value that allows passage of the alternating signal Valt but prevents passage of the video signal Vimage. In this case, the backlight unit 5 is not always required to be turned OFF in the contact detection sub-frame.

Various modifications can be made to the embodiment described above. In the following, such a modified example is described.

First, in the embodiment described above, the video signal shielding electrodes 26 are used as the excitation electrode EX, and the pixel electrodes 15 are used as the detection electrode RC. However, various electrodes may be used as the excitation electrode EX and the detection electrode RC, and this setting may be changed. Specifically, as each of the excitation electrode EX and the detection electrode RC, at least one of the pixel electrode 15, the common electrode 16, the video signal line 25, and the video signal shielding electrode 26 may be used.

[Embodiment 2]

Figure 11:
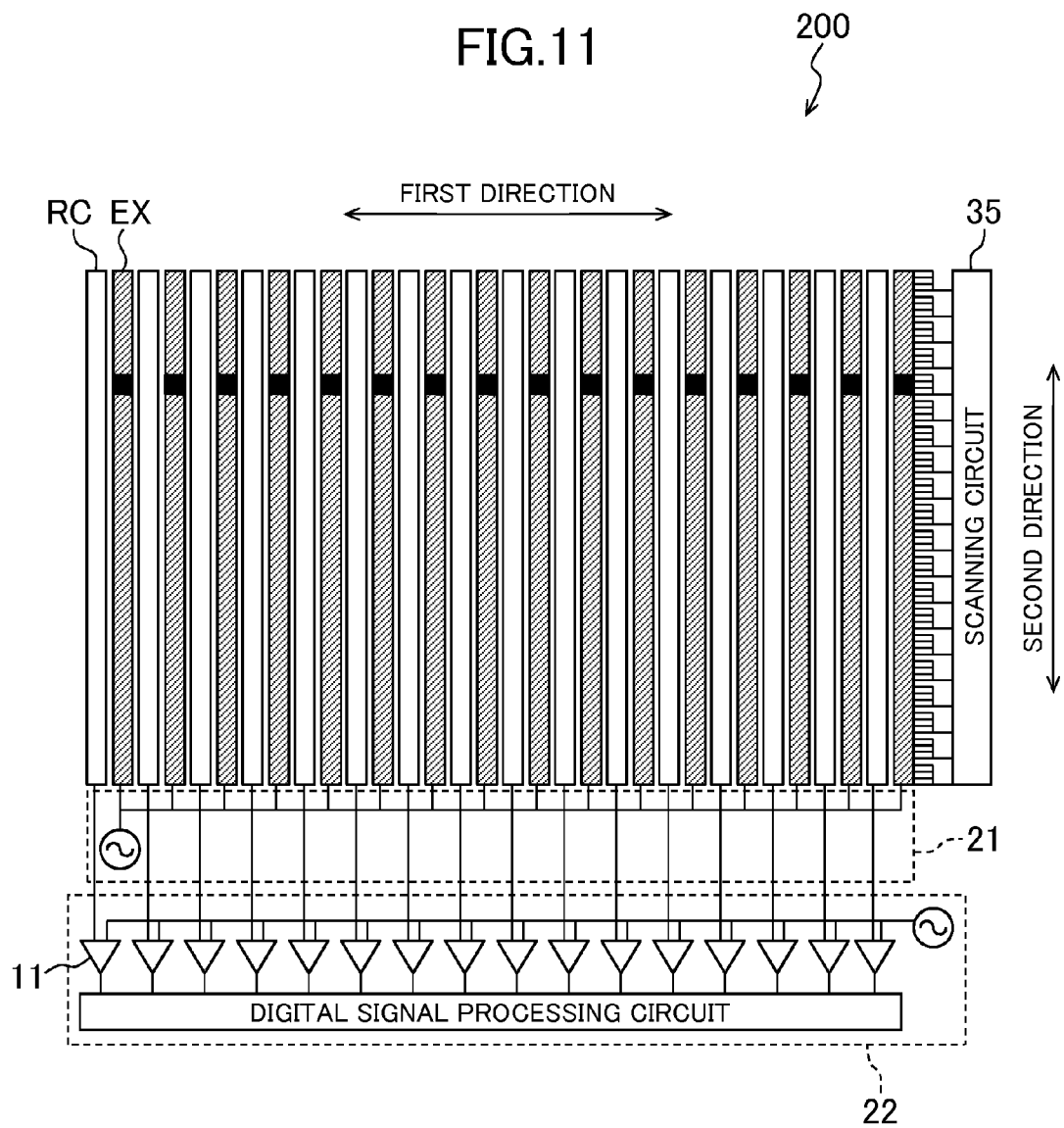
FIG. 11 is a view schematically illustrating an overall configuration of an embedded touch screen according to Embodiment 2 of the present invention for performing contact detection and coordinate detection.

FIG. 11 is a view schematically illustrating an overall configuration of an embedded touch screen 200 according to Embodiment 2 of the present invention for contact detection and coordinate detection. Note that, detailed structures of the embedded touch screen 200 other than those illustrated in FIG. 11 are similar to those in the embedded touch screen 100 according to Embodiment 1 described above, and hence redundant description thereof is omitted.

The embedded touch screen 200 uses the video signal shielding electrodes 26 as the detection electrode RC, and uses the pixel electrodes 15 as the excitation electrode EX. Therefore, the application circuit 21 is connected to the video signal lines 25 connected to the respective pixel electrodes 15, and the detection circuit 22 is connected to the video signal shielding electrodes 26. Further, the scanning circuit 35 scans the pixel electrodes 15 for each of the scanning units, and hence in this embodiment, the excitation electrodes EX are scanned in the second direction. Even with such a configuration, just the same as the embodiment described above, the contact position in the first direction is detected based on the position of the amplifier 11 at which the signal change has been detected, and further the contact position in the second direction is detected based on the timing at which the signal change has been detected. With both of those detections, contact detection and coordinate detection are performed. Note that, also in FIG. 11, the excitation electrode EX is illustrated with hatching, and further, the scanning unit in which the TFT 14 is turned ON by the scanning circuit 35 (as an example, the fifth scanning unit from the top) is illustrated as black parts.

Further, FIG. 5 illustrates the case where the common electrodes 16 adjacent to each other in the first direction are short-circuited, but alternatively, in a case of a structure in which the common electrodes 16 adjacent to each other in the second direction are short-circuited, in Embodiments 1 and 2, instead of the video signal shielding electrodes 26, the common electrodes 16 may be used as the excitation electrode EX or the detection electrode RC.

[Embodiment 3]

Figure 12:
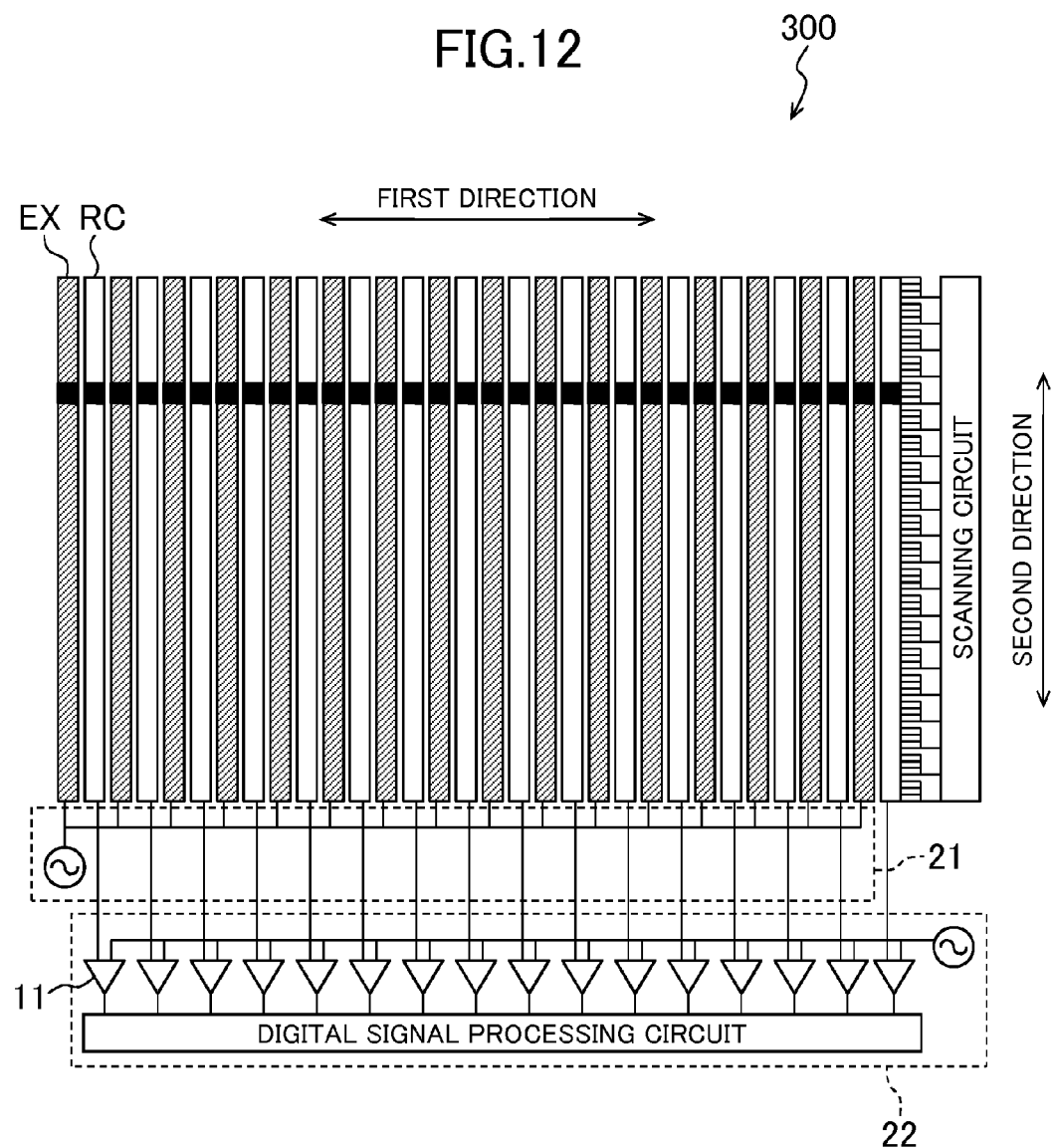
FIG. 12 is a view schematically illustrating an overall configuration of an embedded touch screen according to Embodiment 3 of the present invention for performing contact detection and coordinate detection.

FIG. 12 is a view schematically illustrating an overall configuration of an embedded touch screen 300 according to Embodiment 3 of the present invention for contact detection and coordinate detection. Note that, detailed structures of the embedded touch screen 300 other than those illustrated in FIG. 12 are also similar to those in the embedded touch screen 100 according to Embodiment 1 described above, and hence redundant description thereof is omitted.

In the embedded touch screen 300, the pixel electrodes 15 are used as both the excitation electrode EX and the detection electrode RC. Therefore, the application circuit 21 is connected to the video signal lines 25 connected to the pixel electrodes 15 to be used as the excitation electrode EX, and the detection circuit 22 is connected to the video signal lines 25 connected to the pixel electrode 15 to be used as the detection electrode RC. Further, the scanning circuit 35 scans the pixel electrodes 15 for each of the scanning units, and hence in this embodiment, both of the excitation electrode EX and the detection electrode RC are scanned simultaneously in the second direction. Even with such a configuration, just the same as Embodiment 1, the contact position in the first direction is detected based on the position of the amplifier 11 at which the signal change has been detected, and further the contact position in the second direction is detected based on the timing at which the signal change has been detected. With both of those detections, contact detection and coordinate detection are performed. Note that, also in FIG. 12, the excitation electrode EX is illustrated with hatching, and further, the scanning unit in which the TFT 14 is turned ON by the scanning circuit 35 (as an example, the fifth scanning unit from the top) is illustrated as black parts.

[Embodiment 4]

Figure 13:
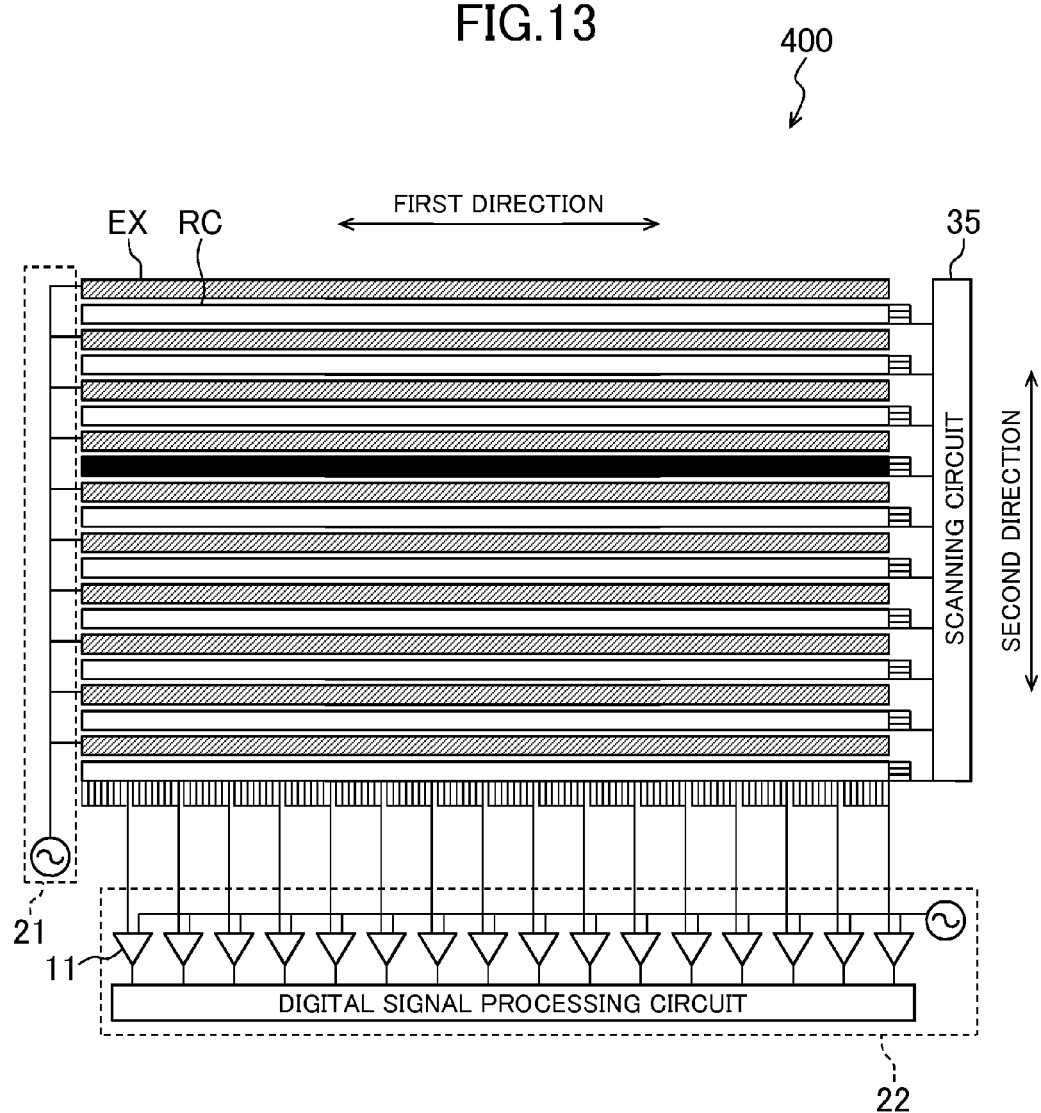
FIG. 13 is a view schematically illustrating an overall configuration of an embedded touch screen according to Embodiment 4 of the present invention for performing contact detection and coordinate detection.

FIG. 13 is a view schematically illustrating an overall configuration of an embedded touch screen 400 according to Embodiment 4 of the present invention for contact detection and coordinate detection. Note that, detailed structures of the embedded touch screen 400 other than those illustrated in FIG. 13 are also similar to those in the embedded touch screen 100 according to Embodiment 1 described above, and hence redundant description thereof is omitted.

In the embedded touch screen 400, the arrangement direction of each of the excitation electrode EX and the detection electrode RC is the first direction, and each of the excitation electrode EX and the detection electrode RC is shaped so as to extend in the first direction. Further, the excitation electrode EX and the detection electrode RC are alternately arranged in the second direction. In this case, it is necessary to use electrodes extending in the first direction as the excitation electrode EX, and in this embodiment, the common electrodes 16 are used. Further, the pixel electrodes 15 are used as the detection electrode RC. Therefore, the application circuit 21 is connected to the common electrodes 16 used as the excitation electrode EX. Further, the detection circuit 22 is connected to the video signal lines 25. The video signal lines are collected for each of necessary number of pixels in the first direction, in this embodiment, for eight pixels, and are connected to the amplifier 11. Further, the scanning circuit 35 is connected to the scanning signal lines 24 connected to the pixel electrodes 15 used as the detection electrode RC, and scans the detection electrodes RC in the second direction for each of the scanning units.

Even with such a configuration, just the same as Embodiment 1, the contact position in the first direction is detected based on the position of the amplifier 11 at which the signal change has been detected, and further the contact position in the second direction is detected based on the timing at which the signal change has been detected. With both of those detections, contact detection and coordinate detection are performed. Note that, also in FIG. 13, the excitation electrode EX is illustrated with hatching, and further, the scanning unit in which the TFT 14 is turned ON by the scanning circuit 35 (as an example, the fourth scanning unit from the top) is illustrated as a black part.

Further, as described in Embodiment 2 in contrast to Embodiment 1, the excitation electrode EX and the detection electrode RC in this embodiment may be replaced with each other.

[Embodiment 5]

Figure 14:
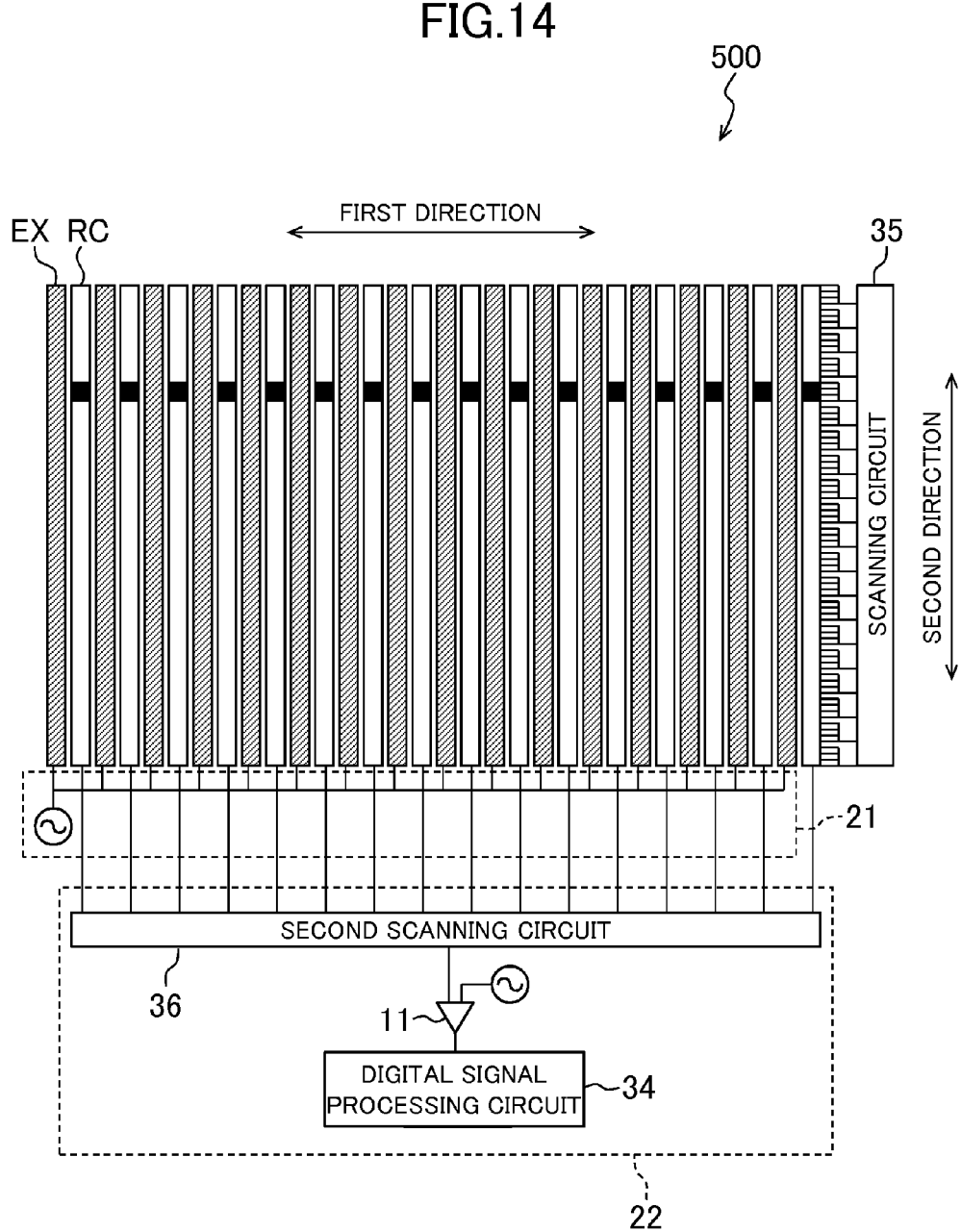
FIG. 14 is a view schematically illustrating an overall configuration of an embedded touch screen according to Embodiment 5 of the present invention for performing contact detection and coordinate detection.

FIG. 14 is a view schematically illustrating an overall configuration of an embedded touch screen 500 according to Embodiment 5 of the present invention for contact detection and coordinate detection. Note that, detailed structures of the embedded touch screen 500 other than those illustrated in FIG. 14 are also similar to those in the embedded touch screen 100 according to Embodiment 1 described above, and hence redundant description thereof is omitted.

In the embedded touch screen 500, the arrangement and configuration of the excitation electrode EX and the detection electrode RC, and the arrangement and configuration of the application circuit 21 are the same as those in Embodiment 1. The configuration of the detection circuit 22 is different from that in Embodiment 1, and the amplifier 11 is connected to the respective detection electrodes RC via a second scanning circuit 36. Further, the number of the amplifiers 11 is only one in this embodiment, and is smaller than the number of the detection electrodes RC.

In this embodiment, the detection electrode RC is time-divided also in the first direction. Thus, from the timing at which the contact detection is performed, coordinate detection is performed not only in the second direction but also in the first direction. That is, the second scanning circuit 36 sequentially connects the amplifier 11 and the detection electrodes RC to scan the detection electrodes RC in the first direction. During the scanning performed by the second scanning circuit, one of the detection electrodes RC is connected to the amplifier 11.

Further, simultaneously, the scanning circuit 35 performs scanning in the second direction. The order of the scanning performed by the second scanning circuit 36 in the first direction and the scanning performed by the scanning circuit 35 in the second direction is not limited, but in this embodiment, under a state in which a specific scanning unit is selected by the scanning circuit 35 in the second direction, a sequence of scanning is performed by the second scanning circuit 36 in the first direction. Then, the scanning circuit 35 selects a new scanning unit, and a sequence of scanning is performed by the second scanning circuit 36 in the first direction again. This operation is repeated to scan the entire image region. In this manner, based on the timing at which the change of the signal from the amplifier 11 has been detected, contact positions both in the first direction and the second direction are detected, thereby performing contact detection and coordinate detection.

In this configuration, the scanning in the first direction is repeated, and hence as compared to Embodiment 1, the time taken for contact detection and coordinate detection becomes longer. However, in this embodiment, the amplifier 11 is provided in a small number of merely one, and further, the number of signal lines is also small. Thus, the circuit scale of the digital signal processing circuit 34 is reduced, and the detection circuit 22 becomes simple and compact.

Note that, also in FIG. 14, the excitation electrode EX is illustrated with hatching, and further, the scanning unit in which the TFT 14 is turned ON by the scanning circuit 35 (as an example, the fifth scanning unit from the top) is illustrated as black parts. Further, the configuration in which the detection circuit 22 includes the second scanning circuit 36 as in this embodiment may be applied not only to Embodiment 1 but also to Embodiments 2 to 4 and Embodiments 6 to 9 to be described later.

[Embodiment 6]

Figure 15:
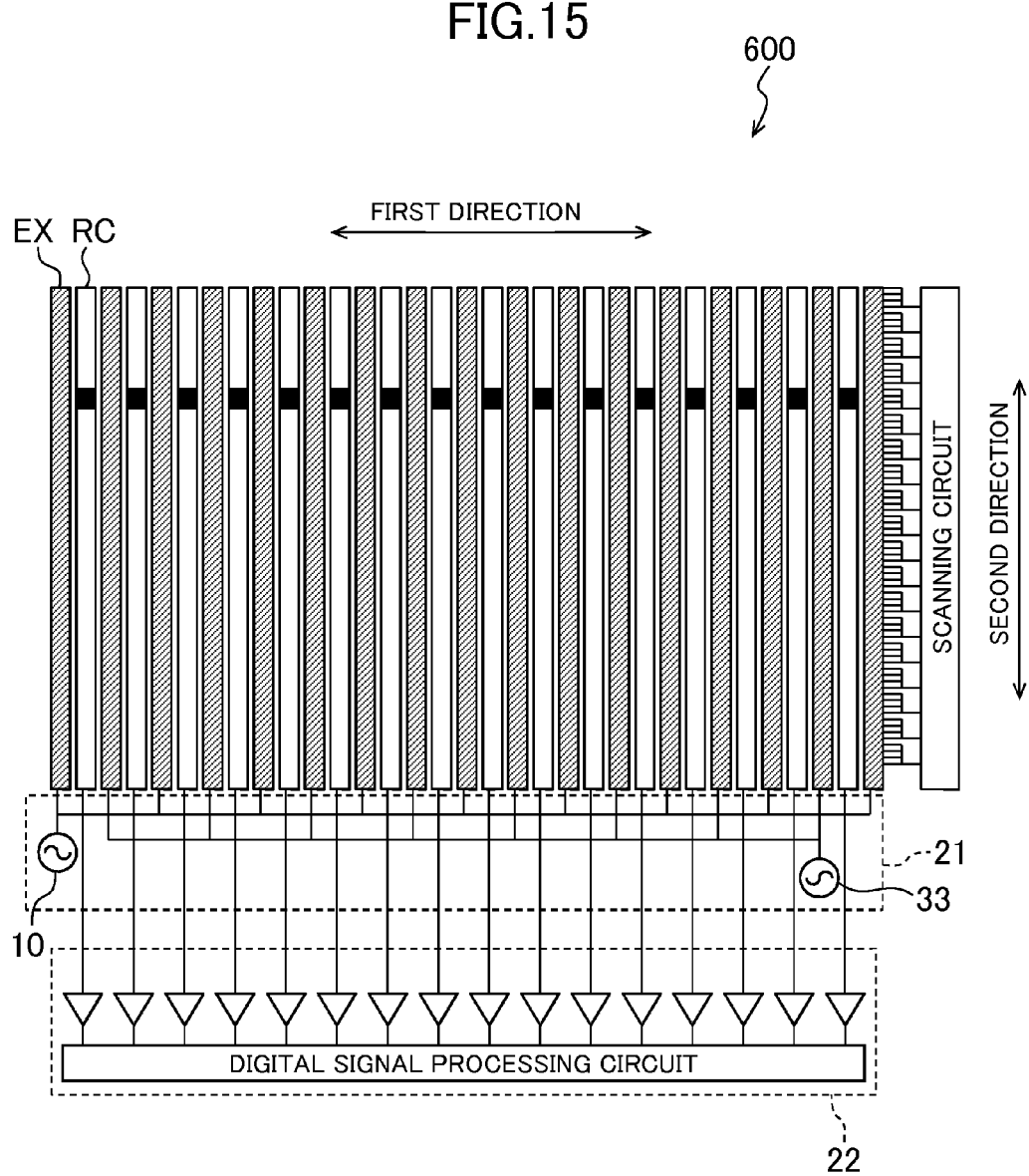
FIG. 15 is a view schematically illustrating an overall configuration of an embedded touch screen according to Embodiment 6 of the present invention for performing contact detection and coordinate detection.

FIG. 15 is a view schematically illustrating an overall configuration of an embedded touch screen 600 according to Embodiment 6 of the present invention for contact detection and coordinate detection. Note that, detailed structures of the embedded touch screen 600 other than those illustrated in FIG. 15 are also similar to those in the embedded touch screen 100 according to Embodiment 1 described above, and hence redundant description thereof is omitted.

In the embedded touch screen 600, the arrangement and configuration of the excitation electrode EX and the detection electrode RC are the same as those in Embodiment 1.

The application circuit 21 includes, in addition to the alternating power source 10, a second alternating power source 33, and the alternating signal from the alternating power source 10 is applied to the alternate excitation electrodes EX in the first direction. An alternating signal from the second alternating power source 33 is applied to the remaining excitation electrodes EX. That is, when focusing on only the excitation electrodes EX, along the first direction, the alternating signal from the alternating power source 10 and the alternating signal from the second alternating power source 33 are alternately applied.

In this case, the alternating signal output from the second alternating power source 33 is a signal having a phase that is reversed by 180° with respect to the alternating signal output from the alternating power source 10. Therefore, when focusing on one of the detection electrodes RC, the alternating signal output from the alternating power source 10 is applied to one of the excitation electrodes EX adjacent to the corresponding detection electrode RC, while the alternating signal having a phase that is reversed by 180° with respect thereto is output from the second alternating power source 33 to be applied to the other of the excitation electrodes EX, which is located on the opposite side.

With this configuration, under a state in which nothing is brought into contact with the surface of the embedded touch screen 600, an alternating electric field excited by the alternating signal output from the alternating power source 10 and an alternating electric field excited by the alternating signal having a phase that is reversed by 180° with respect thereto act on the detection electrodes RC. Thus, both of the alternating electric fields are balanced to be cancelled, and hence almost no signal is detected. In contrast, when a finger or the like is brought into contact with the surface of the embedded touch screen 600, this balance is disturbed, and thus the detection electrode RC detects a signal. Even with such a configuration, the sensitivity and accuracy of contact detection can be enhanced.

Note that, FIG. 15 illustrates the second alternating power source 33 as if the second alternating power source 33 is provided separately from the alternating power source 10, but the present invention is not always limited thereto. That is, a part of the alternating power source 10 may be used as the second alternating power source 33, or a part of the second alternating power source 33 may be used as the alternating power source 10. For example, a phase reversing circuit may be connected to the alternating power source 10, to thereby obtain the alternating signal having a phase that is reversed by 180° with respect to the alternating signal from the alternating power source 10. In this case, the second alternating power source 33 includes the alternating power source 10 and the phase reversing circuit. Further, also in FIG. 15, the excitation electrode EX is illustrated with hatching, and further, the scanning unit in which the TFT 14 is turned ON by the scanning circuit 35 (as an example, the fifth scanning unit from the top) is illustrated as black parts. Further, the configuration in which the alternating signal having a phase that is reversed by 180° with respect to the alternating signal applied to one of the excitation electrodes EX adjacent to the detection electrode RC is applied to the other of the excitation electrodes EX adjacent to the detection electrode RC as in this embodiment may be applied not only to Embodiment 1 but also to Embodiments 2 to 5 and Embodiments 7 to 9 to be described later.

[Embodiment 7]

Figure 16:
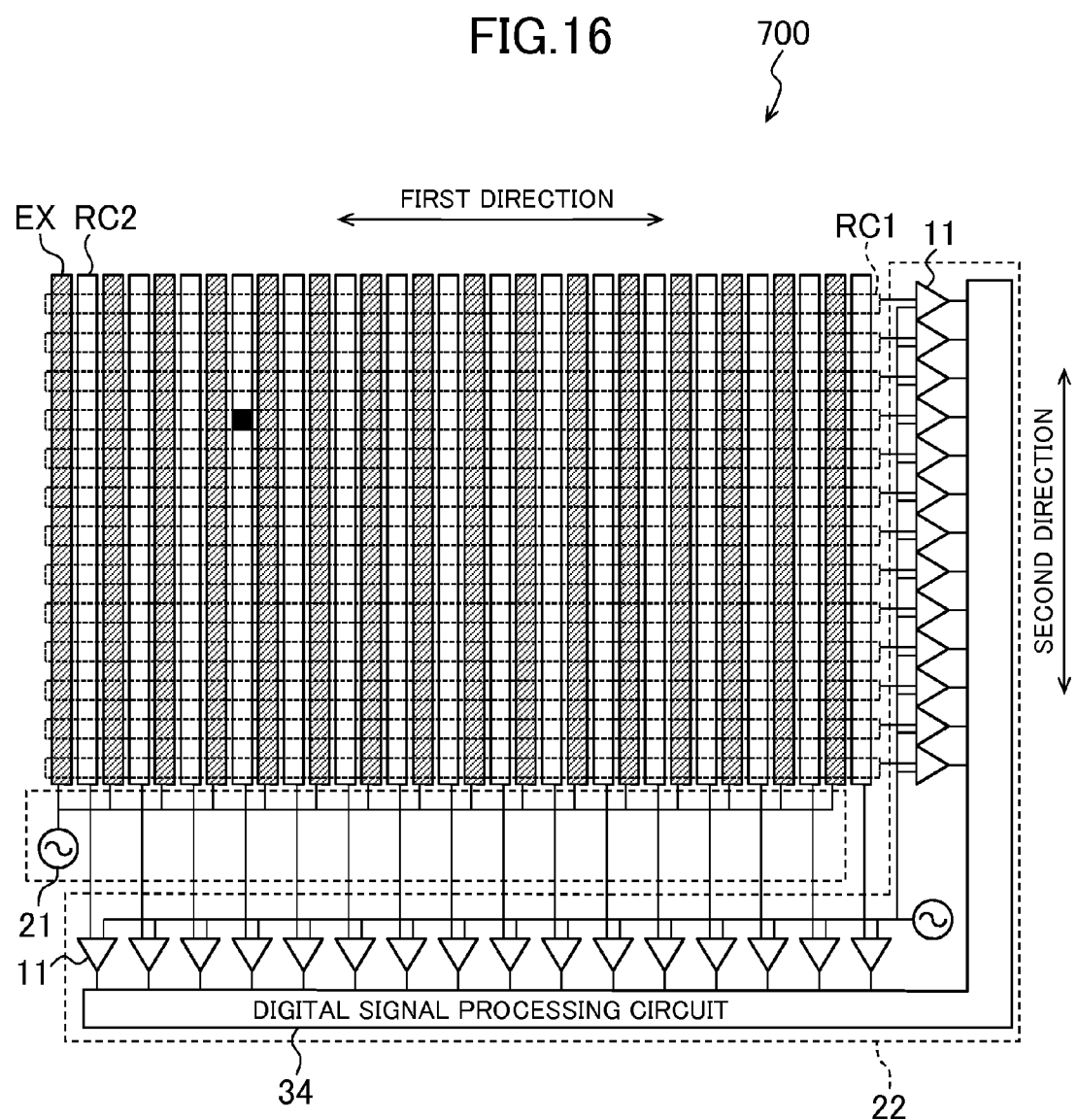
FIG. 16 is a view schematically illustrating an overall configuration of an embedded touch screen according to Embodiment 7 of the present invention for performing contact detection and coordinate detection.

FIG. 16 is a view schematically illustrating an overall configuration of an embedded touch screen 700 according to Embodiment 7 of the present invention for contact detection and coordinate detection. Note that, detailed structures of the embedded touch screen 700 other than those illustrated in FIG. 16 are also similar to those in the embedded touch screen 100 according to Embodiment 1 described above, and hence redundant description thereof is omitted.

In the embedded touch screen 700, the arrangement and configuration of the excitation electrode EX and the arrangement and configuration of the application circuit 21 are the same as those in Embodiment 1. Further, the detection electrode includes a first detection electrode RC1 arranged along the first direction and a second detection electrode RC2 arranged along the second direction. In this case, as described above, the excitation electrode EX is obtained by collecting a plurality of video signal shielding electrodes 26, and is arranged along the second direction. Further, the first detection electrode RC1 is obtained by collecting a plurality of common electrodes 16, and is arranged along the first direction. Further, the second detection electrode RC2 is obtained by collecting a plurality of pixel electrodes 15, and is arranged along the second direction. The excitation electrodes EX are arranged with clearances provided in the first direction, and each of those clearances extends in the second direction, and the second detection electrode RC2 is arranged at a position overlapping with the clearance between the adjacent excitation electrodes EX. As a result, the excitation electrode EX and the second detection electrode RC2 are arranged adjacent to each other without overlapping with each other. On the other hand, the first detection electrode RC1 partially overlaps with the excitation electrode EX and the second detection electrode RC2.

Further, the detection circuit 22 includes a plurality of amplifiers 11, and each of the amplifiers 11 is connected to corresponding one of the first detection electrodes RC1 and corresponding one of the second detection electrodes RC2.

With such a configuration, without performing scanning at all, the coordinates of the contact position can be immediately specified based on the positions of the amplifiers 11 at which the signal change has been detected. For example, when the signal change is detected by the fourth amplifier 11 from the left among the amplifiers 11 arranged in the first direction and by the fourth amplifier 11 from the top among the amplifiers 11 arranged in the second direction, it is specified that contact has been made at a position illustrated as a black part in FIG. 16. Thus, with this configuration, contact detection and coordinate detection can be performed in a short period of time, or an integration time for detection can be taken long. Therefore, resistance with respect to noise can be enhanced.

As a matter of course, even when the number of the amplifiers 11 and the circuit scale of the digital signal processing circuit 34 are reduced with use of the second scanning circuit 36 (see FIG. 14) as described in Embodiment 5, there is no obstacle in performing contact detection and coordinate detection.

Further, the arrangement direction of the excitation electrode EX in this embodiment is merely an example, and instead of the second direction, the first direction may be set as the arrangement direction. In this case, for example, the common electrodes 16 may be used as the excitation electrode EX, and the first detection electrode RC1 is arranged at the position overlapping with the clearance between the excitation electrodes EX.

Note that, also in FIG. 16, the excitation electrode EX is illustrated with hatching.

By the way, in Embodiment 7, the excitation electrode EX and the first detection electrode RC1 are partially overlapped with each other. Therefore, the alternating electric field directed from the excitation electrode EX toward the first detection electrode RC1 concentrates at the overlapping part, and is less likely to protrude from the embedded touch screen 700 on the front surface side, which may cause reduction in sensitivity in contact detection and coordinate detection.

[Embodiment 8]

Figure 17:
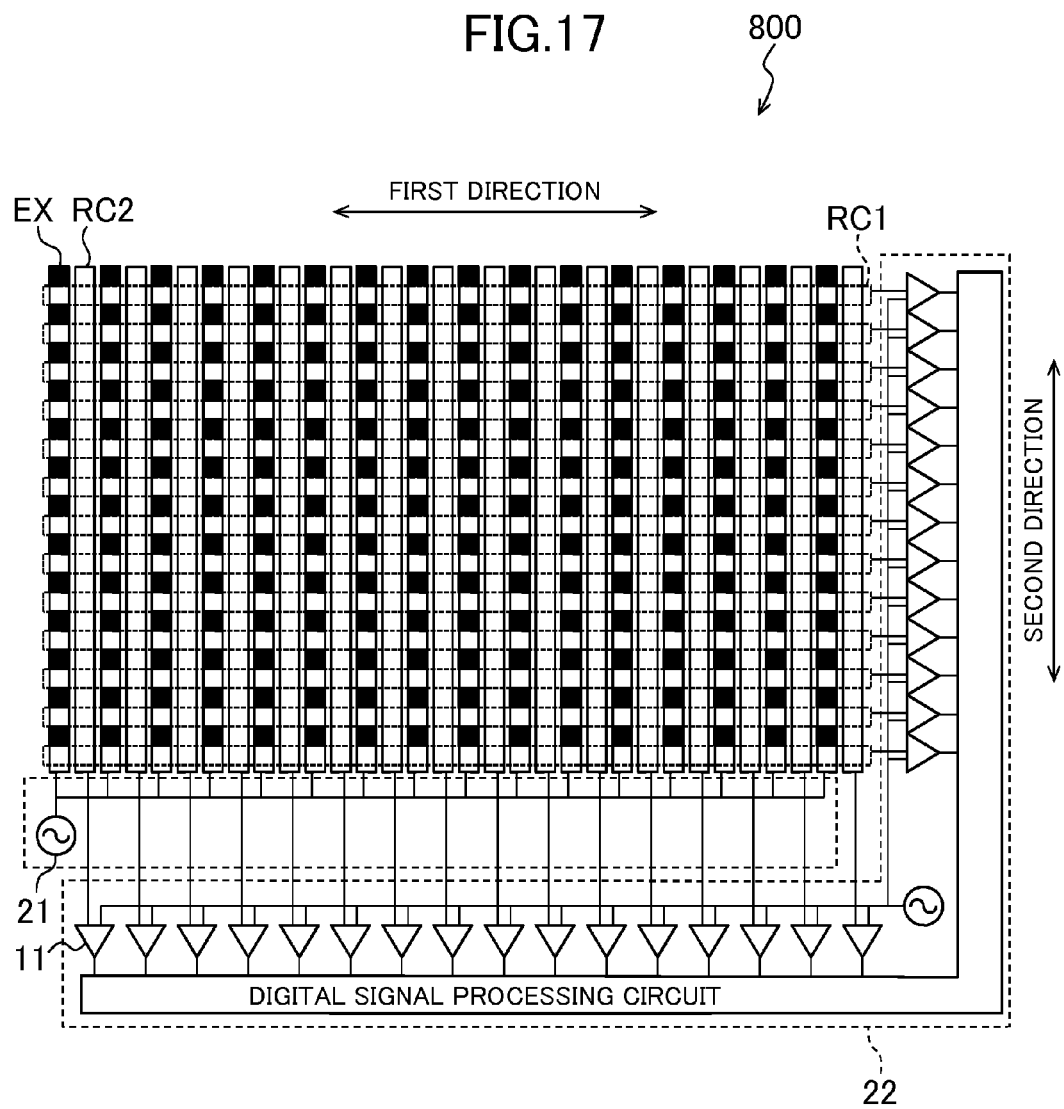
FIG. 17 is a view schematically illustrating an overall configuration of an embedded touch screen according to Embodiment 8 of the present invention for performing contact detection and coordinate detection.

FIG. 17 is a view schematically illustrating an overall configuration of an embedded touch screen 800 according to Embodiment 8 of the present invention for contact detection and coordinate detection, which solves the above-mentioned problem. Note that, detailed structures of the embedded touch screen 800 other than those illustrated in FIG. 17 are also similar to those in the embedded touch screen 100 according to Embodiment 1 described above, and hence overlapping description thereof is omitted.

In the embedded touch screen 800, the excitation electrode EX is obtained by collecting a plurality of pixel electrodes 15, and is arranged along the second direction. Further, the first detection electrode RC1 arranged along the first direction is obtained by collecting a plurality of common electrodes 16, and the second detection electrode RC2 is obtained by collecting a plurality of video signal shielding electrodes 26.

Further, the detection circuit 22 includes a plurality of amplifiers 11, and each of the amplifiers 11 is connected to corresponding one of the first detection electrodes RC1 and corresponding one of the second detection electrodes RC2.

In this case, a circuit (not shown) is used to supply signals to, among the scanning signal lines 24 driving the TFTs 14 connected to the pixel electrodes 15, only scanning signal lines 24 which are connected to the pixels that do not overlap with the first detection electrodes RC1, to thereby turn ON the TFTs 14. As a result, as illustrated in FIG. 17 as black parts, only regions present in matrix provided separately in both the first direction and the second direction function as the excitation electrodes EX. As a result, both of the first detection electrode RC1 and the second detection electrode RC2 are each arranged at the position overlapping with the clearance between the excitation electrodes EX. Therefore, both of the first detection electrode RC1 and the second detection electrode RC2 are each arranged adjacent to the excitation electrode EX without overlapping with the excitation electrode EX.

With this, both of the alternating electric field directed from the excitation electrode EX to the first detection electrode RC1 and the alternating electric field directed from the excitation electrode EX to the second detection electrode RC2 protrude from the embedded touch screen 700 on the front surface side, and hence contact detection can be performed with good sensitivity.

Note that, the remaining points in this embodiment are the same as those in Embodiment 7 described above.

[Embodiment 9]

Figure 18:
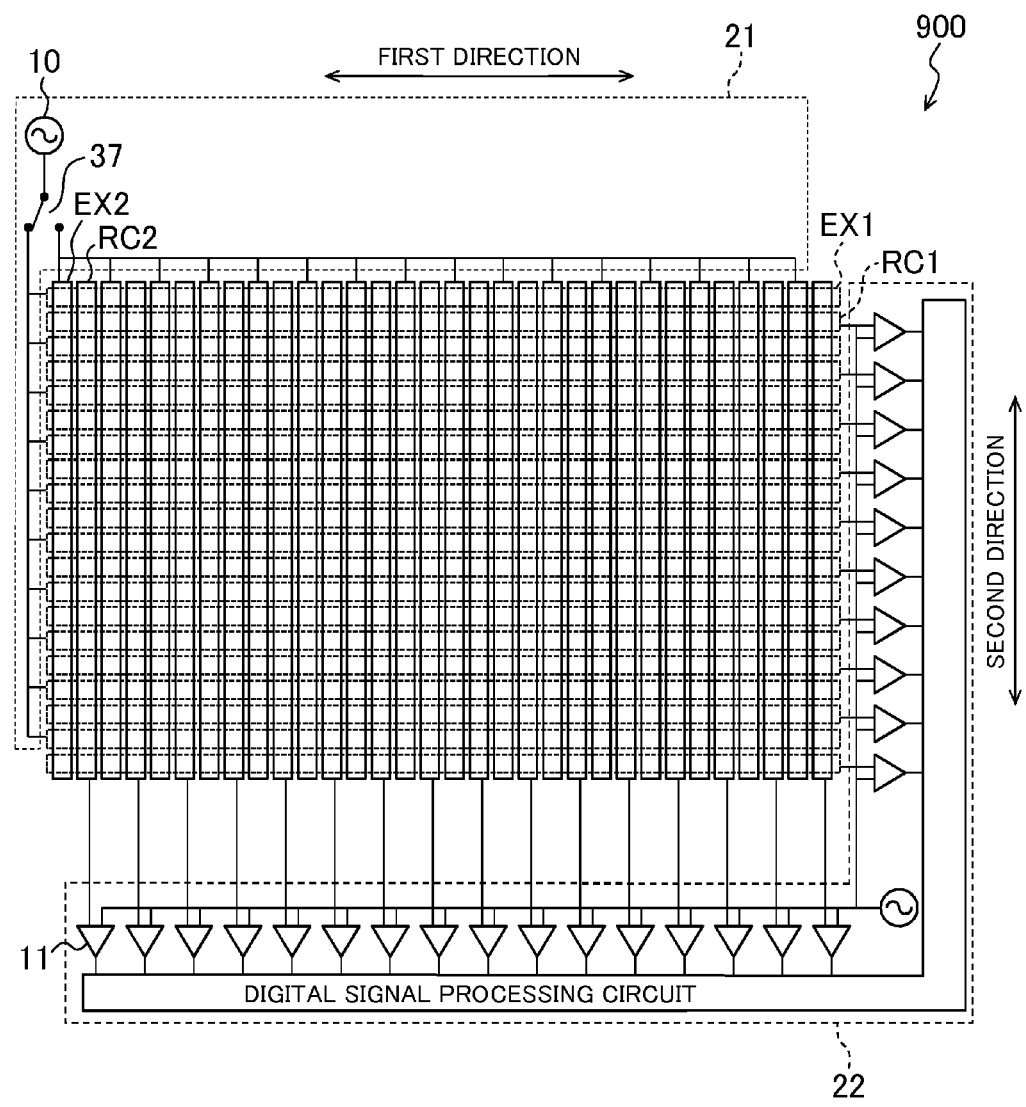
FIG. 18 is a view schematically illustrating an overall configuration of an embedded touch screen according to Embodiment 9 of the present invention for performing contact detection and coordinate detection.

FIG. 18 is a view schematically illustrating an overall configuration of an embedded touch screen 900 according to Embodiment 9 of the present invention for contact detection and coordinate detection. Note that, detailed structures of the embedded touch screen 900 other than those illustrated in FIG. 18 are also similar to those in the embedded touch screen 100 according to Embodiment 1 described above, and hence redundant description thereof is omitted.

In the embedded touch screen 900, the excitation electrode includes a first excitation electrode EX1 arranged along the first direction and a second excitation electrode EX2 arranged along the second direction. Further, the detection electrode includes the first detection electrode RC1 arranged along the first direction and the second detection electrode RC2 arranged along the second direction. Further, the first excitation electrode EX1 and the first detection electrode RC1 are arranged adjacent to each other alternately in the second direction, and the second excitation electrode EX2 and the second detection electrode RC2 are arranged adjacent to each other alternately in the first direction. Specifically, in this embodiment, each of the first detection electrode RC1 and the first detection electrode RC1 is obtained by collecting a plurality of common electrodes 16, and each of the second excitation electrode EX2 and the second detection electrode RC2 is obtained by collecting a plurality of video signal shielding electrodes 26. As a matter of course, the electrodes to be used may be changed to other electrodes.

The application circuit 21 is configured to input the alternating signal from the alternating power source 10 to the first excitation electrode EX1 or the second excitation electrode EX2 via a change-over switch 37. With the control of the change-over switch 37, the alternating signal is applied only to one of the first excitation electrode EX1 and the second excitation electrode EX2. The configuration of the detection circuit 22 is the same as that in Embodiment 7 described above.

Contact detection and coordinate detection are performed at two stages in this embodiment. That is, first, by setting the change-over switch 37 at a first position, the application circuit 21 applies the alternating signal only to the first excitation electrode EX1. At this time, only the first detection electrode RC1 is used as the detection electrode, and the detection circuit 22 detects presence/absence of change in output of the amplifiers 11 arranged in the second direction in FIG. 18. As a result, contact position is detected in the second direction.

Subsequently, by setting the change-over switch 37 at a second position, the application circuit 21 applies the alternating signal only to the second excitation electrode EX2. At this time, only the second detection electrode RC2 is used as the detection electrode. As a result, contact position is detected in the first direction.

Further, from the detection result in the first direction and the detection result in the second direction, contact position is specified in both directions. Thus, contact detection and coordinate detection are performed.

As described above, in this embodiment, contact position in the first direction and contact position in the second direction are detected separately in a time-divided manner. Even in this case, the alternating signal applied by the alternating power source 10 is a high-frequency wave and the detection of the contact position itself is performed instantaneously, and hence there is no particular problem in detection of physical contact, particularly detection of operation by human.

Note that, the specific configurations embodied in the respective embodiments described above are merely examples for describing the present invention, and such specific configurations do not limit the technical scope of the present invention. A person skilled in the art can appropriately modify or optimize the contents disclosed in the respective embodiments. For example, arrangement positions, numbers, and shapes of the respective members may be arbitrarily changed as necessary.

In other words, while there have been described what are at present considered to be certain embodiments of the invention, it will be understood that various modifications may be made thereto, and it is intended that the appended claims cover all such modifications as fall within the true spirit and scope of the invention.

What is claimed is:

1. An embedded touch screen, comprising:
   a first substrate;
   a second substrate comprising, on a front surface thereof:
      a plurality of scanning signal lines extending in a first direction;
      a plurality of video signal lines extending in a second direction;
      a plurality of switching elements, each electrically connected to one of the plurality of scanning signal lines and one of the plurality of video signal lines;
      a plurality of pixels sectioned by the plurality of scanning signal lines and the plurality of video signal lines in matrix being arranged in an image region and each comprising a pixel electrode connected to corresponding one of the plurality of video signal lines via one of the plurality of the switching elements connected to corresponding one of the plurality of scanning signal lines; and
      a common electrode;
   a liquid crystal layer sandwiched between the first substrate and the second substrate;
   an application circuit for applying an alternating signal;
   a detection circuit for detecting a signal excited on a plurality of detection electrodes; and
   a scanning circuit for scanning, during application by the application circuit and detection by the detection circuit, at least one of a plurality of excitation electrodes and the plurality of detection electrodes at least in the second direction,
   wherein each of the plurality of excitation electrodes extend along the second direction, each of the plurality of detection electrodes extend along the second direction, and each of the plurality of excitation electrodes and each of the plurality of detection electrodes are alternatively arranged and adjacent to each other in the first direction;
   wherein the plurality of excitation electrodes define the pixel electrodes and the plurality of detection electrodes define a video signal shielding electrode provided in parallel to the each of the plurality of video signal lines in an overlapping manner,
   wherein the scanning circuit provides on-voltage with a plurality of switching elements for each scanning unit that is time-divided, the scanning unit includes a number of scanning signal lines from among the plurality of scanning signal lines, and wherein a contact position in the first direction is detected based on a position at which a change of the signal is detected, and the contact position in the second direction is detected based on a timing at which the change of the signal is detected.

2. The embedded touch screen according to claim 1, wherein, during the application by the application circuit and the detection by the detection circuit, the detection circuit detects the signals excited on the plurality of detection electrodes through the scanning in the second direction.

3. The embedded touch screen according to claim 1, wherein a pitch between one of the plurality of excitation electrodes and an adjacent one of the plurality of detection electrodes is larger than a distance between a front surface of the first substrate and the front surface of the second substrate.

4. The embedded touch screen according to claim 1, wherein the application circuit applies an alternating signal, which has a phase reversed by 180° with respect to an alternating signal applied to one of the plurality of excitation electrodes adjacent to a corresponding one of the plurality of detection electrodes, to another of the plurality of excitation electrodes adjacent to the corresponding one of the plurality of detection electrodes.

5. The embedded touch screen according to claim 1, wherein the detection circuit obtains a difference between the signal excited by the corresponding one of the plurality of detection electrodes and an alternating signal in the same phase as the alternating signal applied by the application circuit.

6. The embedded touch screen according to claim 1, further comprising a video display circuit for writing a video signal into the pixel electrode,
wherein the video signal is updated in a period corresponding to a frame, the frame including:
a writing period in which the video display circuit writes the video signal; and
a detection period in which the application by the application circuit and the detection by the detection circuit are performed, and
wherein, during the detection period, one of causing the pixel electrode to hold a signal for black display and turning OFF a backlight unit is performed.

7. The embedded touch screen according to claim 1, further comprising a video display circuit for writing a video signal into the pixel electrode,
wherein the video signal is updated in a period corresponding to a frame, the frame including:
a writing period in which the video display circuit writes the video signal; and
a detection period in which the application by the application circuit and the detection by the detection circuit are performed, and
wherein, during the detection period, the pixel electrode holds the video signal, and one of the alternating signal applied by the application circuit and a signal excited by the alternating signal is superimposed to the pixel electrode.

* * * * *